United States Patent
Livoti et al.

(10) Patent No.: US 12,301,534 B2
(45) Date of Patent: May 13, 2025

(54) METHODS AND APPARATUS TO FACILITATE DEVICE IDENTIFICATION

(71) Applicant: The Nielsen Company (US), LLC, New York, NY (US)

(72) Inventors: John T. Livoti, Clearwater, FL (US); Stanley Wellington Woodruff, Palm Harbor, FL (US); Rajakumar Madhanganesh, Tampa, FL (US); Joseph Kerkes, Lutz, FL (US); Khushboo Agarwal, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/832,962

(22) Filed: Mar. 27, 2020

(65) Prior Publication Data
US 2021/0306296 A1    Sep. 30, 2021

(51) Int. Cl.
*H04L 61/5007* (2022.01)
*H04L 41/00* (2022.01)
(Continued)

(52) U.S. Cl.
CPC .......... *H04L 61/5007* (2022.05); *H04L 41/24* (2013.01); *H04L 61/103* (2013.01); *H04L 2101/622* (2022.05)

(58) Field of Classification Search
CPC ... H04L 61/2007; H04L 41/24; H04L 61/103; H04L 61/6022; H04L 61/10; H04L 61/00;
(Continued)

(56) References Cited

U.S. PATENT DOCUMENTS

| 4,972,503 A | 11/1990 | Zurlinden |
| 5,751,967 A * | 5/1998 | Raab ................... H04L 41/0894 |
| | | 709/228 |

(Continued)

FOREIGN PATENT DOCUMENTS

| WO | 2001014989 A1 | 3/2001 |
| WO | 2014176171 A1 | 10/2014 |

OTHER PUBLICATIONS

John, Arul, "MAC Address and OUI Lookup," arul's utilies, 02019, pp. 1-4, May 22, 2019, retrieved from https://aruljohn.com/mac.pl May 22, 2019 (pp. 4).

(Continued)

*Primary Examiner* — Kamal B Divecha
*Assistant Examiner* — Vinh Nguyen

(57) ABSTRACT

Methods, apparatus, systems and articles of manufacture are disclosed to facilitate device identification. An example apparatus includes a communications analyzer to, responsive to identifying a network address of a media device compare a hardware address associated with the network address of the media device to a list of known hardware addresses, and when the list does not include the hardware address, store the hardware address in a data store, a communications transmitter to transmit the hardware address to a network activity monitoring system, the network activity monitoring system to communicate with a device identifying entity to obtain identifying data of the device based on the hardware address, and a communications data storer to, responsive to obtaining the identifying data from the network activity monitoring system, store the identifying data in a data store.

17 Claims, 13 Drawing Sheets

(51) Int. Cl.
   *H04L 61/103* (2022.01)
   *H04L 101/622* (2022.01)
(58) Field of Classification Search
   CPC .......... H04L 29/12009; H04L 61/2015; H04L 61/20; H04L 61/106; H04L 61/5007; H04L 2101/622; H04L 61/5014; H04N 21/42684
   See application file for complete search history.

(56) References Cited

U.S. PATENT DOCUMENTS

| | | | |
|---|---|---|---|
| 5,958,010 A | 9/1999 | Agarwal et al. | |
| 6,442,144 B1* | 8/2002 | Hansen | H04L 29/12018 370/255 |
| 6,578,021 B1 | 6/2003 | Barillaud | |
| 7,180,115 B1 | 2/2007 | Hofmann et al. | |
| 7,801,150 B1 | 9/2010 | Rupavatharam | |
| 7,885,205 B2* | 2/2011 | Jeansonne | H04L 61/5092 370/254 |
| 7,904,608 B2* | 3/2011 | Price | G06F 8/65 710/16 |
| 7,966,428 B2 | 6/2011 | Jalon | |
| 7,996,894 B1* | 8/2011 | Chen | H04L 63/08 709/239 |
| 8,209,740 B1* | 6/2012 | Kulaga | H04L 41/0853 726/12 |
| 8,578,468 B1* | 11/2013 | Yadav | H04L 63/20 726/13 |
| 8,591,340 B2* | 11/2013 | Robb | G07F 17/32 463/42 |
| 8,700,657 B2 | 4/2014 | Frett et al. | |
| 8,843,953 B1 | 9/2014 | Dang et al. | |
| 9,032,477 B2* | 5/2015 | Ranjan | G06F 8/71 726/2 |
| 9,119,070 B2* | 8/2015 | Brindza | H04W 12/122 |
| 9,135,293 B1* | 9/2015 | Kienzle | G06F 16/245 |
| 9,560,007 B2* | 1/2017 | Watanabe | H04L 61/103 |
| 9,647,779 B2 | 5/2017 | Besehanic | |
| 9,721,073 B2* | 8/2017 | Schröder | G06F 8/65 |
| 10,284,665 B2 | 5/2019 | Besehanic | |
| 10,482,890 B2* | 11/2019 | Srinivasan | H04N 21/44222 |
| 10,609,166 B2 | 3/2020 | Besehanic | |
| 10,938,654 B2* | 3/2021 | Arunachalam | H04L 61/6022 |
| 11,019,164 B2 | 5/2021 | Besehanic | |
| 11,265,286 B2* | 3/2022 | Mermoud | H04L 67/535 |
| 11,323,317 B1* | 5/2022 | Levin | H04L 67/34 |
| 11,652,899 B2 | 5/2023 | Besehanic | |
| 11,652,901 B2 | 5/2023 | Besehanic | |
| 11,924,646 B2* | 3/2024 | Singh | G06Q 20/325 |
| 2001/0034232 A1 | 10/2001 | Kuwahara | |
| 2002/0136268 A1 | 9/2002 | Gan et al. | |
| 2002/0198762 A1 | 12/2002 | Donato | |
| 2003/0037163 A1* | 2/2003 | Kitada | H04L 12/4645 709/236 |
| 2004/0040023 A1* | 2/2004 | Ellis | G06F 8/60 717/174 |
| 2004/0049586 A1* | 3/2004 | Ocepek | H04L 29/12018 709/229 |
| 2004/0111640 A1* | 6/2004 | Baum | H04L 63/1408 709/224 |
| 2006/0268744 A1 | 11/2006 | Sakai et al. | |
| 2007/0237141 A1* | 10/2007 | Marchese | H04L 41/12 370/389 |
| 2008/0133719 A1* | 6/2008 | Amitai | H04L 63/0209 709/221 |
| 2008/0134165 A1* | 6/2008 | Anderson | H04N 21/4586 717/173 |
| 2008/0155613 A1 | 6/2008 | Benya et al. | |
| 2008/0263579 A1 | 10/2008 | Mears et al. | |
| 2008/0281966 A1* | 11/2008 | Jennings, III | H04L 63/0272 709/225 |
| 2009/0019141 A1* | 1/2009 | Bush | H04L 41/0853 715/734 |
| 2009/0172443 A1* | 7/2009 | Rothman | G06F 1/3209 713/323 |
| 2009/0210892 A1 | 8/2009 | Ramaswamy | |
| 2009/0232028 A1* | 9/2009 | Baalbergen | H04L 67/18 370/255 |
| 2009/0235244 A1* | 9/2009 | Enomori | H04L 67/34 717/170 |
| 2009/0323634 A1 | 12/2009 | Kim et al. | |
| 2010/0106769 A1 | 4/2010 | Blanchard et al. | |
| 2010/0115543 A1 | 5/2010 | Falcon | |
| 2010/0228625 A1 | 9/2010 | Priyadarshan et al. | |
| 2010/0242095 A1 | 9/2010 | Mendenhall | |
| 2010/0248627 A1* | 9/2010 | S. | H04W 8/18 455/41.2 |
| 2010/0309912 A1 | 12/2010 | Mehta et al. | |
| 2010/0321647 A1 | 12/2010 | Schuler et al. | |
| 2011/0013806 A1 | 1/2011 | Zuev et al. | |
| 2011/0019673 A1 | 1/2011 | Fernández Gutiérrez | |
| 2011/0055928 A1* | 3/2011 | Brindza | H04W 12/08 726/26 |
| 2011/0067119 A1 | 3/2011 | Baum | |
| 2011/0077043 A1 | 3/2011 | Aoyagi et al. | |
| 2011/0113455 A1 | 5/2011 | Wu | |
| 2011/0138064 A1* | 6/2011 | Rieger | H04N 21/436 707/715 |
| 2011/0149960 A1 | 6/2011 | Fernández Gutiérrez | |
| 2011/0213863 A1 | 9/2011 | Shah et al. | |
| 2011/0241821 A1 | 10/2011 | Jalon | |
| 2012/0011559 A1 | 1/2012 | Miettinen et al. | |
| 2012/0026999 A1 | 2/2012 | Choi et al. | |
| 2012/0036220 A1 | 2/2012 | Dare et al. | |
| 2012/0036552 A1 | 2/2012 | Dare et al. | |
| 2012/0042005 A1 | 2/2012 | Papakostas et al. | |
| 2012/0060228 A1* | 3/2012 | Katkar | G06F 21/10 726/33 |
| 2012/0093508 A1 | 4/2012 | Baykal et al. | |
| 2012/0131157 A1 | 5/2012 | Gospodarek et al. | |
| 2012/0173701 A1 | 7/2012 | Tenbrock | |
| 2012/0174088 A1* | 7/2012 | Jung | G06F 8/654 717/171 |
| 2012/0185910 A1 | 7/2012 | Miettinen et al. | |
| 2012/0221716 A1 | 8/2012 | Halevi et al. | |
| 2013/0005296 A1 | 1/2013 | Papakostas et al. | |
| 2013/0006435 A1 | 1/2013 | Berrios et al. | |
| 2013/0007236 A1 | 1/2013 | Besehanic | |
| 2013/0046651 A1 | 2/2013 | Edson | |
| 2013/0061243 A1 | 3/2013 | Pillers | |
| 2013/0070639 A1 | 3/2013 | Demura et al. | |
| 2013/0111013 A1 | 5/2013 | Besehanic | |
| 2013/0128751 A1 | 5/2013 | Keesara et al. | |
| 2013/0132152 A1 | 5/2013 | Srivastava et al. | |
| 2013/0137451 A1 | 5/2013 | Meredith et al. | |
| 2013/0150002 A1 | 6/2013 | Croy et al. | |
| 2013/0212200 A1 | 8/2013 | Dennis et al. | |
| 2013/0232251 A1 | 9/2013 | Pauley | |
| 2013/0244579 A1 | 9/2013 | Hohteri et al. | |
| 2013/0308641 A1* | 11/2013 | Ackley | H04L 61/103 370/392 |
| 2014/0003286 A1 | 1/2014 | Estevez et al. | |
| 2014/0122715 A1 | 5/2014 | Rowe | |
| 2014/0157298 A1* | 6/2014 | Murphy | H04N 21/2347 725/110 |
| 2014/0237498 A1* | 8/2014 | Ivins | G06Q 30/02 725/14 |
| 2014/0244828 A1* | 8/2014 | Besehanic | H04L 67/535 709/224 |
| 2014/0287682 A1 | 9/2014 | Minemura et al. | |
| 2014/0317114 A1 | 10/2014 | Alla et al. | |
| 2014/0317270 A1 | 10/2014 | Besehanic | |
| 2015/0063233 A1 | 3/2015 | Choi et al. | |
| 2015/0085775 A1 | 3/2015 | Choi et al. | |
| 2015/0089032 A1* | 3/2015 | Agarwal | H04L 41/0893 709/221 |
| 2015/0121540 A1* | 4/2015 | Citron | G06Q 50/184 726/27 |
| 2015/0207667 A1* | 7/2015 | Basso | H04L 49/70 709/223 |

(56) References Cited

U.S. PATENT DOCUMENTS

| | | | |
|---|---|---|---|
| 2015/0222939 A1* | 8/2015 | Gallant | H04L 43/062 725/9 |
| 2015/0277856 A1* | 10/2015 | Payne | G06F 7/588 708/250 |
| 2015/0327052 A1* | 11/2015 | Ghai | H04W 48/02 370/328 |
| 2015/0334523 A1 | 11/2015 | Lappetelainen et al. | |
| 2016/0174006 A1 | 6/2016 | Lee et al. | |
| 2016/0254946 A1* | 9/2016 | Prevost | H04W 12/06 455/420 |
| 2017/0041410 A1* | 2/2017 | Bosworth | H04L 67/30 |
| 2017/0060918 A1* | 3/2017 | Iyer | G06F 3/0685 |
| 2017/0195294 A1* | 7/2017 | Branca | H04L 63/102 |
| 2017/0244797 A1* | 8/2017 | Besehanic | H04L 61/2015 |
| 2017/0280266 A1* | 9/2017 | Brisebois | H04B 7/18578 |
| 2017/0288965 A1* | 10/2017 | Cebere | H04L 12/4625 |
| 2018/0048534 A1* | 2/2018 | Banga | G06N 20/00 |
| 2018/0124009 A1* | 5/2018 | Kerkes | H04L 61/6009 |
| 2018/0167473 A1* | 6/2018 | Gierada | H04L 67/22 |
| 2018/0307472 A1* | 10/2018 | Paul | H04L 63/0823 |
| 2019/0058907 A1 | 2/2019 | Schenker et al. | |
| 2019/0132625 A1* | 5/2019 | Matsunaga | G06Q 30/0255 |
| 2019/0245785 A1* | 8/2019 | Haapanen | H04L 45/74 |
| 2019/0260842 A1 | 8/2019 | Besehanic | |
| 2020/0076896 A1* | 3/2020 | Anumala | H04L 12/28 |
| 2020/0125355 A1* | 4/2020 | Aust | G06F 8/65 |
| 2020/0133654 A1* | 4/2020 | Lei | G06F 8/71 |
| 2020/0153735 A1* | 5/2020 | Du | H04L 41/00 |
| 2020/0155045 A1* | 5/2020 | Sharrock | A61B 10/0012 |
| 2020/0169528 A1* | 5/2020 | Le | H04W 4/70 |
| 2020/0186885 A1* | 6/2020 | Menand | H04N 21/25875 |
| 2020/0213352 A1* | 7/2020 | Fainberg | H04L 63/0853 |
| 2020/0228615 A1 | 7/2020 | Besehanic | |
| 2020/0252239 A1* | 8/2020 | Lee | H04L 12/66 |
| 2021/0011705 A1* | 1/2021 | Liu | G06F 8/65 |
| 2021/0136084 A1* | 5/2021 | Dayan | H04L 63/08 |
| 2021/0243603 A1* | 8/2021 | Yin | H04L 9/0861 |
| 2021/0266258 A1* | 8/2021 | Sheu | H04L 69/22 |
| 2021/0281516 A1* | 9/2021 | Hatta | H04L 41/0823 |
| 2021/0281652 A1 | 9/2021 | Besehanic | |
| 2021/0303636 A1 | 9/2021 | Dua et al. | |
| 2021/0306296 A1 | 9/2021 | Livoti et al. | |
| 2021/0365445 A1 | 11/2021 | Robell et al. | |
| 2023/0146079 A1 | 5/2023 | Jeng et al. | |
| 2023/0214384 A1 | 7/2023 | Kerkes | |
| 2023/0231929 A1 | 7/2023 | Besehanic | |

OTHER PUBLICATIONS

United States Patent and Trademark Office, Non-Final Office Action, issued in connection with U.S. Appl. No. 17/886,441, dated Nov. 27, 2023, 17 pages.

International Search Report and Written Opinion, issued in connection with International Application No. PCT/US2014/034820, dated Aug. 14, 2014, 9 pages.

Klijun, Streaming meter generic solution for proprietary WiFi extenders : A generic solution approach to recognize a metered device connected to the proprietary WiFe extender, the Nielsen Company (US) LLC, Mar. 31, 2020, 7 Pages.

Nielsen gets rid of its offensively outdated Diary that Logged TV Habits, The Hustle, Sep. 15, 2016, 05 Pages.

Nielsen will close the chapter on papaer diaries for TV ratings by early 2018, Tampa Bay Times, Sep. 15, 2016, 07 Pages.

*The Nielsen Company (US), LLV v. HyphaMetrics, Inc.*, Case No. 23-00136, Complaint for Patent Infringement, May 17, 2023, 20 pages.

*The Nielsen Company (US), LLV v. HyphaMetrics, Inc.*, Case No. 23-136-GBW, Exhibit B, Invalidity of U.S. Pat. No. 11,652,901, Oct. 31, 2023, 19 pages.

*The Nielsen Company (US), LLV v. HyphaMetrics, Inc.*, Case No. 23-532-GBW, Defendant's Initial Invalidity Contentions, Oct. 31, 2023, 31 pages.

United States Patent and Trademark Office, Final Office Action, issued in connection with U.S. Appl. No. 13/931,750, dated Jan. 26, 2016, 11 pages.

United States Patent and Trademark Office, Final Office Action, issued in connection with U.S. Appl. No. 13/931,750, dated Sep. 15, 2016, 14 pages.

United States Patent and Trademark Office, Non-Final Office Action, issued in connection with U.S. Appl. No. 13/931,750, dated Mar. 24, 2016, 18 pages.

United States Patent and Trademark Office, Non-Final Office Action, issued in connection with U.S. Appl. No. 13/931,750, dated Jul. 1, 2015, 10 pages.

United States Patent and Trademark Office, Non-Final Office Action, issued in connection with U.S. Appl. No. 15/588,245, dated Aug. 29, 2018, 16 pages.

United States Patent and Trademark Office, Non-Final Office Action, issued in connection with U.S. Appl. No. 16/404,366, dated Aug. 23, 2019, 4 pages.

United States Patent and Trademark Office, Non-Final Office Action, issued in connection with U.S. Appl. No. 16/834,842, dated Oct. 8, 2020, 6 pages.

United States Patent and Trademark Office, Non-Final Office Action, issued in connection with U.S. Appl. No. 17/328,860, dated Oct. 6, 2022, 5 pages.

United States Patent and Trademark Office, Non-Final Office Action, issued in connection with U.S. Appl. No. 17/956,450, dated Dec. 9, 2022, 13 pages.

United States Patent and Trademark Office, Final Office Action, issued in connection with U.S. Appl. No. 17/886,441, dated Apr. 26, 2024, 20 pages.

*The Nielsen Company (US), LLC v. HyphaMetrics, Inc.*, Case No. 23-136-GBW-CJB, HyphaMetrics' Final Invalidity Contentions, Oct. 9, 2024, 9 pages.

*The Nielsen Company (US), LLC v. HyphaMetrics, Inc.*, Case No. 23-136-GBW-CJB, Exhibit A1 accompanying HyphaMetrics' Final Invalidity Contentions, Oct. 9, 2024, 28 pages.

*The Nielsen Company (US), LLC v. HyphaMetrics, Inc.*, Case No. 23-136-GBW-CJB, Exhibit A3 accompanying HyphaMetrics' Final Invalidity Contentions, Oct. 9, 2024, 18 pages.

USPTO, Non-final Office action dated Sep. 18, 2024 for U.S. Appl. No. 17/886,441, 23 pages.

* cited by examiner

421

| | IP ADDRESS (560) | MAC ADDRESS (565) |
|---|---|---|
| 571 → | 192.168.1.20 | 00:22:34:CD:56:EF |
| 572 → | 192.168.1.32 | 00:19:AB:34:CD:12 |
| 573 → | 192.168.1.31 | 4C:B1:99:12:EF:1A |
| 574 → | 192.168.1.51 | 4C:B1:99:34:CD:86 |
| 575 → | 192.168.1.50 | A0:D2:B1:BD:DC:66 |

FIG. 5

| 614 ↘ | | | | | | |
|---|---|---|---|---|---|---|
| DEVICE NAME (771) | SiteID (772) | Type (773) | Make (774) | Model (775) | Metered (776) | Moveable (777) |
| PS3 | Basement | Game | Sony | Play Station 3 | True | False |
| FAMILYROOM TV | Family Room | Internet | Google | Google TV | True | False |
| PS4 | Family Room | Game | Sony | Play Station 4 | True | False |
| N/A | N/A | N/A | N/A | N/A | True | False |
| -- | -- | -- | -- | -- | -- | -- |

781, 782, 783, 784 label the rows respectively.

FIG. 7A

| MAC ADDRESS (791) | DEVICE NAME (792) |
|---|---|
| 00:22:34:CD:56:EF | N/A |
| 00:19:AB:34:CD:12 | PS3 |
| 00:19:AB:86:91:A2 | PS4 |
| A0:D2:B1:BD:DC:66 | FAMILYROOM TV |

616; rows labeled 795, 796, 797, 798.

FIG. 7B

METHODS AND APPARATUS TO FACILITATE DEVICE IDENTIFICATION

FIELD OF THE DISCLOSURE

This disclosure relates generally to device identification, and, more particularly, to methods and apparatus to facilitate device identification.

BACKGROUND

Media providers and/or metering entities such as, for example, advertising companies, broadcast networks, etc. are often interested in the viewing, listening, and/or media behavior/interests of audience members and/or the public in general. To collect these behavior/interests, an audience measurement company may enlist panelists (e.g., persons agreeing to be monitored) to cooperate in an audience measurement study for a period of time. The media usage habits of these panelists as well as demographic data about the panelists is collected and used to statistically determine the size and demographics of an audience. In recent years, more consumer devices have been provided with Internet connectivity and the ability to retrieve media from the Internet.

BRIEF DESCRIPTION OF THE DRAWINGS

FIG. 5 is an example address resolution protocol (ARP) table that may be stored by the example network communications data store of the example network communications monitor of FIGS. 1, 2, 3, and/or 4 to associate an Internet protocol (IP) address with a hardware address.

FIG. 7A is an example data table that may be stored by the example panelist device data store of FIG. 6 to store a list of panelist devices and additional properties associated therewith.

FIG. 7B is an example data table that may be stored by the example panelist device data store of FIG. 6 to store a mapping between a MAC address and a device name.

Figure 1:
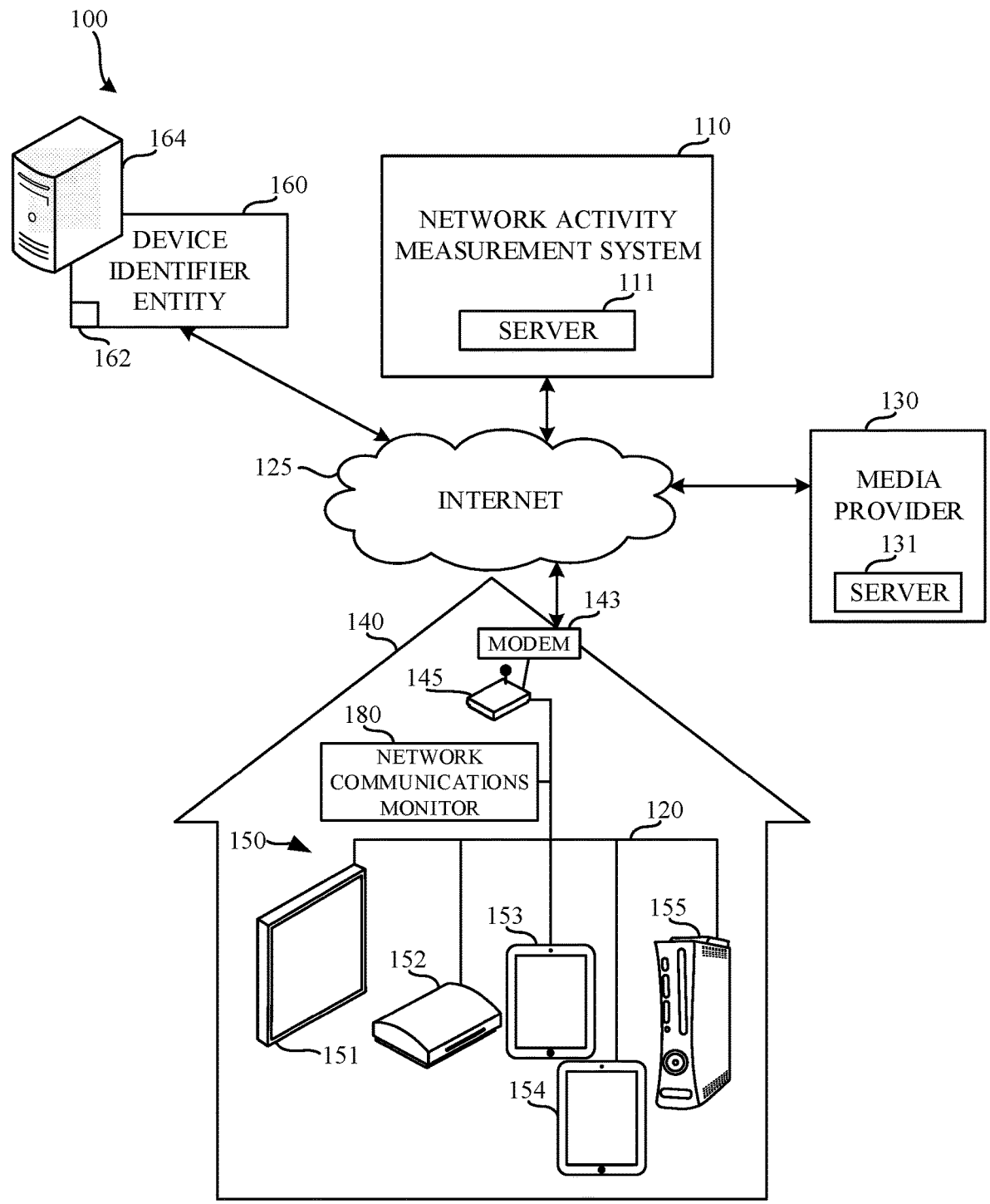
FIG. 1 is a block diagram illustrating an example environment of use including a system to identify media devices constructed in accordance with teachings of this disclosure.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Media monitoring entities desire to monitor activities of media devices present on a user's (e.g., a panelist's) network (e.g., a home network). In some examples, media devices are implemented and/or instrumented with an on-device meter that monitors operations of the media device (e.g., what media is presented by the media device, when the media is presented, etc.). However, not all media devices are amenable to being monitored by an on-device meter. For example, some media devices do not allow installation of third-party software (e.g., an on-device meter). Further, because of the many types of media devices available, maintaining software packages for every type of media device is difficult. Because installation of a monitoring system on all types of network devices may be difficult some network devices may go unmonitored. In examples disclosed herein, network-based monitoring (e.g., monitoring of network communications and/or requests made by media devices) is used to collect network communications of network devices. Network communications of a network device can be used to identify media that is transmitted to and/or from a media device As used herein, the term "media" includes any type of content and/or advertisements, such as television programming, radio programming, news, movies, web sites, etc. Example methods, apparatus, and articles of manufacture disclosed herein identify media devices and/or types of media devices for media measurement. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, identifications of media devices used in consumer locations (e.g., homes, offices, etc.) are aggregated to determine ownership and/or usage statistics of available media devices, relative rankings of usage and/or ownership of media devices, types of uses of media devices (e.g., whether a device is used for browsing the Internet, streaming media from the Internet, etc.), and/or other types of media device information.

In some disclosed examples, a media device includes a network interface to transmit a request for media to be presented by the media device. In such examples, the media device requests media from a media provider via a network (e.g., the Internet). In some examples, the request for media is a HyperText Transfer Protocol (HTTP) request, a Session Initiation Protocol (SIP) message, a domain name service (DNS) query, a file transfer protocol (FTP) request, and/or any other type of request for media (e.g., content and/or advertisements).

Internet Service Providers (ISPs) typically provide a single public Internet protocol (IP) address for each media exposure measurement location (e.g., a media presentation location, a panelist household, an internet café, an office, etc.) receiving Internet services. In some examples, multiple devices (e.g., media devices) are communicatively coupled by a local area network (LAN) at a media exposure measurement location. In some examples, the LAN includes a router and/or gateway that accesses another network (e.g., the Internet) using a public IP address associated with the media exposure measurement location.

Within the LAN, individual media devices are given private IP addresses by, for example, a dynamic host control protocol (DHCP). When a media device within the LAN transmits a request to a resource outside of the LAN (e.g., on the Internet,) the router and/or gateway translates the originating (private) IP address of the device making the query to the public address of the router and/or gateway before relaying the request outside of the LAN (e.g., to the Internet). Thus, when the resource outside of the LAN receives the request, the resource is able to transmit a return message (e.g., a response) to the LAN. On the return path, the router and/or gateway translates the destination IP address of the response to the private IP address of the requesting device so that the return message may be delivered to the media device that made the original request.

Some networks utilize Internet Protocol (IP) for communication. The IP address scheme utilizes IP addresses assigned to media devices. For example, a media device might be assigned an IP version 4 (IPv4) address of 192.168.0.2. Any other past, present, and or future addressing scheme may additionally or alternatively be used such as, for example, IP version 6 (IPv6). In some examples, IP addresses are dynamically assigned using DHCP. Both public and private IP addresses may be assigned using DHCP. In some examples, the IP address assignment is referred to as a lease. IP address leases are generally time-dependent in that they are only valid for a particular period of time (e.g., one day, one week, one month, etc.). After the expiration of the lease, the media device requests a new IP address from a DHCP server (e.g., a router, a server, etc.). Accordingly, more than one IP address might be associated with a media device over an extended period of time. For example, at a first time, the media device might be identified by an IP address of 192.168.0.2, while at a second time, the media device might be identified by an IP address of 192.168.0.3. Further, a second media device may be assigned the first IP address at the second time. Accordingly, identifying which device is associated with network requests occurring on a network based on the IP address alone is difficult.

Network interfaces of media devices are provided with a hardware address. In examples disclosed herein, the hardware address is referred to as a media access control (MAC) address. However, any other past, present, and/or future hardware address naming convention and/or scheme may additionally or alternatively be used. The MAC address is a serial number of the network interface of the media device. In IP communications, MAC addresses are used to identify the media device to which an IP address is assigned.

Unlike an IP address, the MAC address typically does not change over time and/or does not change frequently. The MAC address of a media device is provided by the hardware manufacturer of the media device at the time of manufacture. In some examples, the MAC address may be changed at a later time (e.g., after manufacturing the device). A MAC address is useful to facilitate coherent data management services (e.g., a mass software update) using a third-party identifier environment (e.g., a device identifier entity such as, for example, Qterics™). For example, such a device identifier entity may obtain or previously have access to a list of MAC addresses, each associated with an individual device. Accordingly, the device identifier entity typically includes a server and an update agent to facilitate coherent data management services. In this example, when a device manufacturer attempts to push a software update to a subset of previously manufactured devices, the device manufacturer communicates information corresponding to the software update and intended devices to the device identifier entity. In this manner, the device identifier entity, using the update agent and the server, facilitates software update(s) to the subset of devices identified by the already stored MAC address. While such examples are described in connection with software updates, such a device identifier entity may provide any suitable coherent data service such as, for example, a firmware update, device reconfiguration, etc.

In examples disclosed herein, the MAC address is a forty-eight bit identifier, and is typically represented as a twelve character hexadecimal identifier. However, any other representation may additionally or alternatively be used. For example, the MAC address convention may change over time to use different numbers and/or types of characters.

In examples disclosed herein, the MAC address includes an organizationally unique identifier (OUI) (e.g., a twenty-four bit identifier). An OUI is used to identify the manufacturer and/or model of the media device. In some examples, the first twelve bits of the OUI identify a manufacturer, while the second twelve bits of the OUI identify a model of the device. Accordingly, a manufacturer and/or model of a device may be identified based on the OUI. The OUI, however, does not distinguish between multiple media devices of the same manufacturer and model. For example, a first iPad may have the same OUI as a second iPad. However, the devices will typically be uniquely identified by the remainder of the MAC address (e.g., the portion of the MAC address following the OUI).

When transmitting network communications (e.g., transmission control protocol (TCP) communications, user datagram protocol (UDP) communications, etc.) the MAC address of the media device is typically not included. Rather, in such messages, the IP address identifies the media device. As disclosed above, the IP address may change over time and, therefore, may not uniquely identify the media device over an extended period of time. Alternatively, a new device in which the make and/or model is not known may transmit network communications (e.g., TCP communications, UDP communications, etc.) on the network. To translate an IP address into a MAC address, media devices include an address resolution protocol (ARP) table. ARP is used to translate a network address (e.g., an IP address) into a hardware address (e.g., a MAC address). The ARP table is maintained by media devices (e.g., a router and/or a gateway) and identifies both a MAC address and an IP address for media devices on the network. As a result, a MAC address can be identified based on an IP address by performing a lookup using the ARP table. However, any other type of table and/or device identification protocol may additionally or alternatively be used such as, for example a neighbor discovery protocol (NDP) (e.g., for use with IP version 6 (IPv6)).

In examples disclosed herein, a network communications monitor is used to capture network communications of media devices on a network (e.g., a home network). The network communications monitor is installed at a media exposure measurement location (e.g., a home) and identifies network communications to and/or from media devices within the media exposure measurement location (e.g., the communications of devices sharing a public IP address via, for example, a gateway). Thus, the example network communications monitor monitors network devices within the media exposure measurement location.

In examples disclosed herein, network monitoring performed by the network communications monitor includes determining a MAC address of a device involved in network communications within a panelist household. While the MAC address is not contained in the network communications itself, it is determined using, for example, an address resolution protocol (ARP) lookup. The network communications monitor creates a log and/or a record of the network communications, identifies a device associated with the network communications (e.g., a device that originates and/or receives the network communications), and electronically transmits the log and/or the record to the network activity measurement system (e.g., to a third party consumer, to an audience measurement entity such as The Nielsen Company (US), LLC, etc.). In some examples, the log of network communications created by the network communications monitor may be transmitted by electronic communications, physically mailing the log (e.g., a log stored on a memory device such as, for example, a flash memory, a compact disc, a DVD, etc.), etc.

In examples disclosed herein, a device that is unidentified and/or otherwise unknown (e.g., a device not associated with a device name and/or additional properties, a device with an unknown MAC address, etc.) may be present within the media exposure measurement location. For example, a user may purchase a new gaming console and such a new gaming console may be unidentified and/or otherwise unknown to the audience measurement entity. To identify the device that is unidentified and/or otherwise unknown, examples disclosed herein include identifying the network address (e.g., the IP address) of such a device. In such examples disclosed herein, a network communications monitor may perform an ARP lookup to determine whether such a network address (e.g., an IP address) is associated with a known hardware address (e.g., a MAC address). In the event the network communications monitor determines the network address (e.g., the IP address) is not associated with a known hardware address (e.g., a MAC address) (e.g., by comparing with known MAC addresses, etc.), examples disclosed herein include transmitting the hardware address (e.g., the MAC address), or the network address (e.g., the IP address), to a network activity measurement system to identify the device.

In examples disclosed herein, a network activity measurement system may perform a second comparison to determine whether the unidentified and/or otherwise unknown hardware address (e.g., the MAC address) is associated with a list of known MAC addresses stored in a database. In the event the network activity measurement system determines the hardware address (e.g., the MAC address) is not known (e.g., the hardware address does not match a known hardware address), the network activity measurement system may transmit such a hardware address (e.g., a MAC address) to a device identifier entity with instructions to identify the device associated with the hardware address (e.g., MAC address). For example, the instructions may request the device identifier entity to identify device identification data such as, for example, device metadata, device model, device make, etc.

Provided that the device identifier entity traditionally has access to a list of device names, device types, etc., associated with a list of MAC addresses (e.g., for the purposes of providing coherent data services), the device identifier entity is useful to assist in identification of a device not known to a system. In examples disclosed herein, a device identifier entity, responsive to obtaining a MAC address from the network activity measurement system, parses the MAC address to identify the OUI. As described above, the device identifier entity typically includes a list of MAC addresses and the associated device, provided by the device manufacturer. Thus, the device identifier entity can identify the device type using the OUI. In this manner, the device identifier entity may utilize the OUI to identify characteristics of the unidentified and/or otherwise unknown device such as, for example, the make, the model, etc. In examples disclosed herein, the device identifier entity transmits an indication to the network activity measurement system that includes the results of the OUI lookup. For example, the device identifier entity may indicate to the network activity measurement system the make and model of the unidentified and/or otherwise unknown device, the hardware version of the unidentified and/or otherwise unknown device, etc. In other examples disclosed herein, the device identifier entity may indicate to the network activity measurement system any suitable identifying characteristic of the device obtained using the hardware address and/or OUI.

Some example methods, apparatus, and articles of manufacture disclosed herein are located at a media exposure measurement location having one or more media devices. In some examples, these example methods, apparatus, and articles of manufacture are interposed between the media devices and a wide area network (WAN), such as the Internet, that includes one or more media providers that provide media in response to request(s) from the media devices. In some examples, the methods, apparatus, and articles of manufacture are interposed on a local area network (LAN) in the same fashion as other media devices are connected to the LAN. Some example methods, apparatus, and articles of manufacture disclosed herein intercept messages to and/or from the WAN (e.g., media requests (e.g., HTTP requests) from media devices on the same LAN as the intercepting method, apparatus, or article of manufacture). When intercepting messages to and/or from the WAN, in some examples, the network communications monitor identifies an internal (e.g., private) IP address associated with the intercepted message (e.g., a destination IP address or a source IP address). In some examples, the internal IP address is used when determining the MAC address of the media device associated with the intercepted message.

Some example methods, apparatus, and articles of manufacture disclosed herein inspect the network communications to determine if the network communications should be recorded. Not all network requests are of interest to the monitoring entity. For example, when the network communications monitor identifies hypertext transfer protocol (HTTP) requests, the network communications are transmitted to a network activity measurement system and/or stored for transmission to the network activity measurement system at a later time. In contrast, when the network communications monitor identifies a message not associated with media presentation (e.g., a border gateway protocol (BGP) message), the network communications monitor may ignore such a message.

FIG. 1 is a block diagram illustrating an example environment of use 100 including a system to identify media devices constructed in accordance with teachings of this disclosure. The example system of FIG. 1 includes a network activity measurement system 110, and a network communications monitor 180. The network communications monitor 180 monitors communications occurring on and/or involving a LAN 120 (e.g., a home network). The example environment 100 of FIG. 1 includes the LAN 120, the Internet 125, an example media provider 130, an example media exposure measurement location 140, and an example device identifier entity 160. The example media exposure measurement location 140 of FIG. 1 includes an example modem 143, an example network gateway 145, and example media devices 150. The network gateway 145 is able to communicate with, for example, the example media provider 130 via the Internet 125. In the illustrated example, network devices 150 include a first media device 151, a second media device 152, a third media device 153, a fourth media device 154, and a fifth media device 155. Additionally, the device identifier entity 160 includes an example update agent 162 and an example server 164.

The network activity measurement system 110 of the illustrated example includes a server 111 that receives network communications collected by the network communications monitor 180 to generate media monitoring information. The server 111 of the network activity measurement system 110 of FIG. 1 analyzes the network communications across multiple measurement locations such as the example measurement location 140, the device identifier entity 160, and/or network communications monitors 180 to identify, for example, which media devices are the most owned, the most-frequently used, the least-frequently owned, the least-frequently used, the most/least-frequently used for particular type(s) and/or genre(s) of media, and/or any other media statistics or aggregate information that may be determined from the data. The media device information may also be correlated or processed with factors such as geodemographic data (e.g., a geographic location of the media exposure measurement location, age(s) of the panelist(s) associated with the media exposure measurement location, an income level of a panelist, etc.). Media device information may be useful to manufacturers and/or advertisers to determine which features should be improved, determine which features are popular among users, identify geodemographic trends, occurrence(s) related to and/or behaviors of (e.g., demographic group(s) in physical geographic area(s) (e.g., North America, the South Eastern US, etc.)) with respect to media devices, identify market opportunities, and/or otherwise evaluate their own and/or their competitors' products. In some examples, the network activity measurement system 110 is a central measurement system that receives and/or aggregates monitoring information collected at multiple different measurement sites.

The Internet 125 of the illustrated example of FIG. 1 is a wide area network (WAN). However, in some examples, local networks may additionally or alternatively be used. For example, multiple networks may be utilized to couple the components of the example environment 100 to identify media devices.

In the illustrated example, the media devices 150 of FIG. 1 are devices that retrieve media from the media provider 130 (e.g., via gateway 145) for presentation at the media exposure measurement location 140. In some examples, the media devices 150 are capable of directly presenting media (e.g., via a display) while, in some other examples, the media devices 150 present the media on separate media presentation equipment (e.g., speakers, a display, etc.). The first media device 151 of the illustrated example is an Internet enabled television, and thus, is capable of directly presenting media (e.g., via an integrated display and speakers). The second media device 152 of the illustrated example is a first gaming console (e.g., Xbox® 360, PlayStation® 3, etc.) and requires additional media presentation equipment (e.g., a television) to present media. The third media device 153 and the fourth media device 154 are tablet devices. In the illustrated example, the third media device 153 and the fourth media device 154 are the same type of device from the same manufacturer (e.g., both the third media device 153 and the fourth media device 154 are Apple iPads). Accordingly, the OUI (e.g., a manufacturer and/or device specific portion of the MAC address) of the third media device 153 and the fourth media device 154 are the same. The fifth media device 155 of the illustrated example is a second gaming console (e.g., Xbox® 360, PlayStation® 3, etc.) and requires additional media presentation equipment (e.g., a television) to present media. Although the fifth media device 155 and the second media device 152 are both gaming consoles, they are not made by the same manufacturer and, accordingly, do not share the same OUI.

In FIG. 1, any of the first media device 151, the second media device 152, the third media device 153, the fourth media device 154, and/or the fifth media device 155 may be unidentified and/or otherwise unknown to the network communications monitor 180 and/or the network activity measurement system 110. For example, though the fifth media device 155 is a second gaming console (e.g., Xbox® 360, PlayStation® 3, etc.), the fifth media device 155 may have been recently purchased and, as such, unidentified and/or otherwise unknown to the media exposure measurement location 140. In examples disclosed herein, in the event the network communications monitor 180 determines any of the first media device 151, the second media device 152, the third media device 153, the fourth media device 154, and/or the fifth media device 155 are unidentified and/or otherwise unknown to the media exposure measurement location 140, the network communications monitor 180 obtains the network address (e.g., the IP address) of the device and attempts to identify the device based on the associated hardware address (e.g., the MAC address).

While, in the illustrated example, an Internet enabled television, gaming consoles, and tablet devices are shown, any other type(s) and/or number(s) of media device(s) may additionally or alternatively be used. For example, Internet-enabled mobile handsets (e.g., a smartphone), tablet computers (e.g., an iPad®, a Google Nexus, etc.) digital media players (e.g., a Roku® media player, a Slingbox®, etc.,) etc. may additionally or alternatively be used. Further, while in the illustrated example five media devices are shown, any number of media devices may be used. While in the illustrated example, media devices 150 may be wired devices (e.g., connected to the network communications monitor 180 via wired connection such as, for example, an Ethernet connection) the media devices 150 may additionally or alternatively be wireless devices (e.g., connected to the network communications monitor 180 via a wireless connection such as, for example, a WiFi connection, a Bluetooth connection, etc.).

The media provider 130 of the illustrated example of FIG. 1 includes a server 131 providing media (e.g., web pages, videos, images, advertisements, etc.). The media provider 130 may be implemented by any provider(s) of media such as a digital broadcast provider (e.g., a cable television service, a fiber-optic television service, etc.) and/or an on-demand digital media provider (e.g., Internet streaming video and/or audio services such as Netflix®, YouTube®, Hulu®, Pandora®, Last.fm®,) and/or any other provider of media services (e.g., streaming media services). In some other examples, the media provider 130 is a host for a web site(s). Additionally or alternatively, the media provider 130 may not be on the Internet. For example, the media provider may be on a private and/or semi-private network (e.g., a LAN.)

The media exposure measurement location 140 of the illustrated example of FIG. 1 is a panelist household. However, the media exposure measurement location 140 may be any other location, such as, for example an internet café, an office, an airport, a library, a non-panelist household, etc. While in the illustrated example a single media exposure measurement location 140 is shown, any number and/or type(s) of media exposure measurement locations may be used.

The modem 143 of the illustrated example of FIG. 1 is a modem that enables network communications of the media exposure measurement location 140 to reach the Internet 125. In some examples, the modem 143 is a digital subscriber line (DSL) modem, while in some other examples the modem 143 is a cable modem. In some examples, the modem 143 is a media converter that converts one communications medium (e.g., electrical communications, optical communications, wireless communications, etc.) into another type of communications medium. In the illustrated example, the modem 143 is separate from the network gateway 145. However, in some examples, the modem 143 may be a part of (e.g., integral to) the network gateway 145.

The example network gateway 145 of the illustrated example of FIG. 1 is a router that enables the media devices 150 to communicate with the Internet 125 (e.g., the Internet). In some examples, the example network gateway 145 includes gateway functionality such as modem capabilities. In some other examples, the example network gateway 145 is implemented in two or more devices (e.g., a router, a modem, a switch, a firewall, etc.).

In some examples, the example network gateway 145 hosts a LAN 120 for the media exposure measurement location 140. In the illustrated example, the LAN 120 is a wired local area network (LAN) that enables the media devices 150 to communicate over a wired electrical connection, and allows the media devices 150 to transmit and receive data via the Internet. In some examples, the LAN 120 is a wireless LAN (WLAN) that enables the media devices 150 to communicate wirelessly. In examples disclosed herein, the example network communications monitor 180 is coupled to the LAN 120.

The network communications monitor 180 of the illustrated example of FIG. 1 is a network device located on the LAN hosted by the example network gateway 145. Additionally or alternatively, the network communications monitor 180 may be integrated into the gateway 145. The network communications monitor 180 of the illustrated example identifies network communications from the media devices 150 within the media exposure measurement location 140. The network communications monitor 180 creates a record (e.g., a log) identifying which of the media device(s) 150 were involved in which of the network communications and transmits the record to the network activity measurement system 110. In some examples, the network communications monitor 180 determines which device was involved in the network communications by inspecting the network communications received at the network communications monitor 180 for indicia that may identify the media device and/or may facilitate identification of the media device (e.g., an IP address that may be used to lookup a MAC address via an ARP table).

In examples disclosed herein, the network communications monitor 180 may identify network communications from the media devices 150 in which any one of the first media device 151, the second media device 152, the third media device 153, the fourth media device 154, and/or the fifth media device 155 may be unidentified and/or otherwise unknown. In such examples disclosed herein, the network communications monitor 180 communicates with the network activity measurement system 110 to identify the unidentified and/or otherwise unknown device. Prior to communicating with the network activity measurement system 110, the network communications monitor 180 identifies the network address (e.g., the IP address) and/or the hardware address (e.g., the MAC address) for use in identification.

In some examples, the example network gateway 145 permits custom firmware and/or software to be loaded and/or executed. In some such examples, the network gateway 145 may be provided with firmware and/or software to implement the network communications monitor 180 (in whole or in part). In such an example, in addition to standard routing and/or modem behavior, the firmware and/or software monitors messages and/or data packets directed from the media devices 150 to the Internet 125 and/or directed from the Internet 125 to the media devices 150. As noted above, such monitoring functionality may be part of and/or shared with a separate device such as, for example, the network communications monitor 180.

Typically, the device identifier entity 160 facilitates coherent data services with any of the first media device 151, the second media device 152, the third media device 153, the fourth media device 154, and/or the fifth media device 155. For example, the example update agent 162 of the device identifier entity 160 operates with the server 164 to distribute software updates to any of the first media device 151, the second media device 152, the third media device 153, the fourth media device 154, and/or the fifth media device 155. In operation, the update agent 162 manages a list of software updates sent by at least one device manufacturer. Such a list of software updates may indicate a scheduled time to push one or more software updates to one or more media devices.

Additionally, the update agent 162 may obtain a list of devices, identified by their MAC address, from the manufacture. Such a list of devices is used by the update agent 162 when identifying where to distribute software updates. In this manner, when a software update is intended (e.g., at a scheduled time, on demand by the manufacturer, etc.), the update agent 162 packages the software update and indicates to the server 164 the MAC addresses of the media devices to be updated. The server 164 then distributes the software update to each of the media devices, so as to facilitate coherent data management services.

While the device identifier entity 160 is described as providing software updates as a type of coherent data management service, any suitable coherent data management service may be provided (e.g., a firmware update, a device reconfiguration, etc.). In examples disclosed herein, the device identifier entity 160 may utilize the list of known MAC addresses to provide identification services to authorized entity. In examples disclosed herein, the device identifier entity 160 is configured to communicate with the network activity measurement system 110 to obtain a hardware address (e.g., a MAC address). In operation, the device identifier entity 160 parses the hardware address (e.g., the MAC address) to identify the OUI. In some examples disclosed herein, the device identifier entity 160 may receive the OUI from the network activity measurement system 110. Responsive to identifying or receiving the OUI, the device identifier entity 160 communicates with an internal and/or external database (e.g., the update agent 162, a manufacturer device database, etc.), to perform a device lookup based on the OUI. In this manner, the device identifier entity 160 can determine identification data (e.g., device make, device model, etc.) of the device associated with the hardware address. In examples disclosed herein, the device identifier entity 160 transmits such identification data to the network activity measurement system 110. In other examples disclosed herein, the network communications monitor 180 may communicate with the device identifier entity 160 and, as such, the device identifier entity 160 may transmit the determined identification data to the network communications monitor 180.

In operation, the example network communications monitor 180 is provided to the panelist and/or otherwise delivered to the media exposure measurement location 140 and is connected to the LAN 120. The example network communications monitor 180 monitors network communications occurring on the LAN 120. Such communications may be indicative of media presentations occurring in the media exposure measurement location 140. The example network communications monitor 180 retrieves the list of device names and scans the LAN 120 to identify hardware addresses of devices on the LAN 120. The network communications monitor 180, upon identifying an unidentified and/or otherwise unknown hardware address, transmits the hardware address to the example network activity measurement system 110. The example network activity measurement system 110 receives a list of network and/or hardware addresses from the network communications monitor 180. The network activity measurement system 110 determines whether the device name and/or device type can be resolved based on the hardware address. In the event the network activity measurement system 110 determines the device name and/or device type cannot be resolved based on the hardware address, the network activity measurement system 110 communicates with the device identifier entity 160 to identify the device.

Upon receiving identification data from the device identifier entity 160, the network activity measurement system 110 maps the relationship between hardware address and device type and/or device name. The example network communications monitor 180 receives mapping information indicating a relationship between a hardware address on the LAN and a device name in the list of device names. The example network communications monitor 180 reports the network communications monitored on the network to the network activity measurement system 110. The example network activity measurement system 110 uses the reported network communications and the mapping to prepare media exposure measurement reports.

Figure 2:
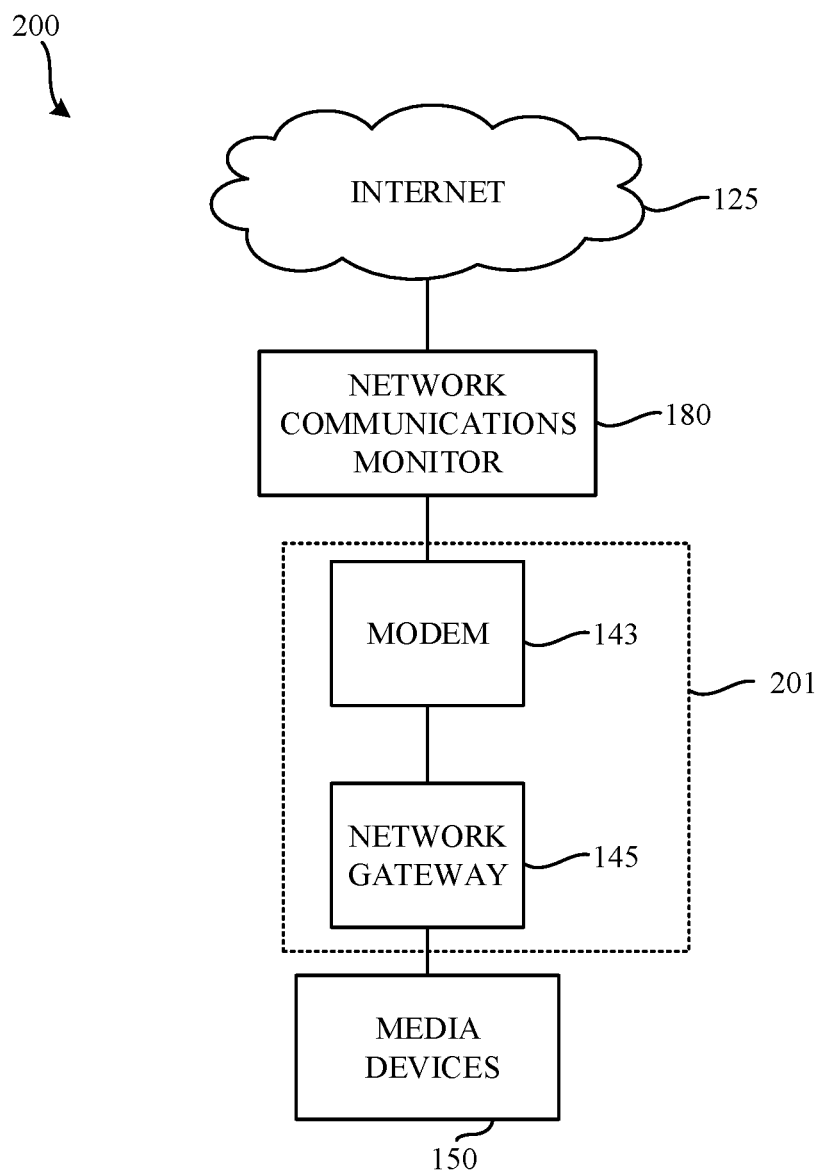
FIG. 2 is a block diagram of a second example configuration of the local area network shown in FIG. 1.

FIG. 2 is a block diagram of a second example configuration 200 of the local area network 120 shown in FIG. 1. In the example configuration 200 of the illustrated example, the network communications monitor 180 is placed between the Internet 125 and the modem 143. The modem 143 communicates with the network gateway 145, which in turn communicates with the media devices 150. In some examples, the modem 143 and the network gateway 145 are implemented in a same device and/or housing 201.

In the illustrated example, the network communications monitor 180 monitors communications between the modem 143 and the Internet 125. For example, when the modem 143 is a DSL modem the network communications monitor 180 monitors the DSL communications. In the illustrated example, the network communications monitor 180 includes one or more ports (e.g., a DSL port, a cable port, etc.) for receiving and/or transmitting network communications.

Figure 3:
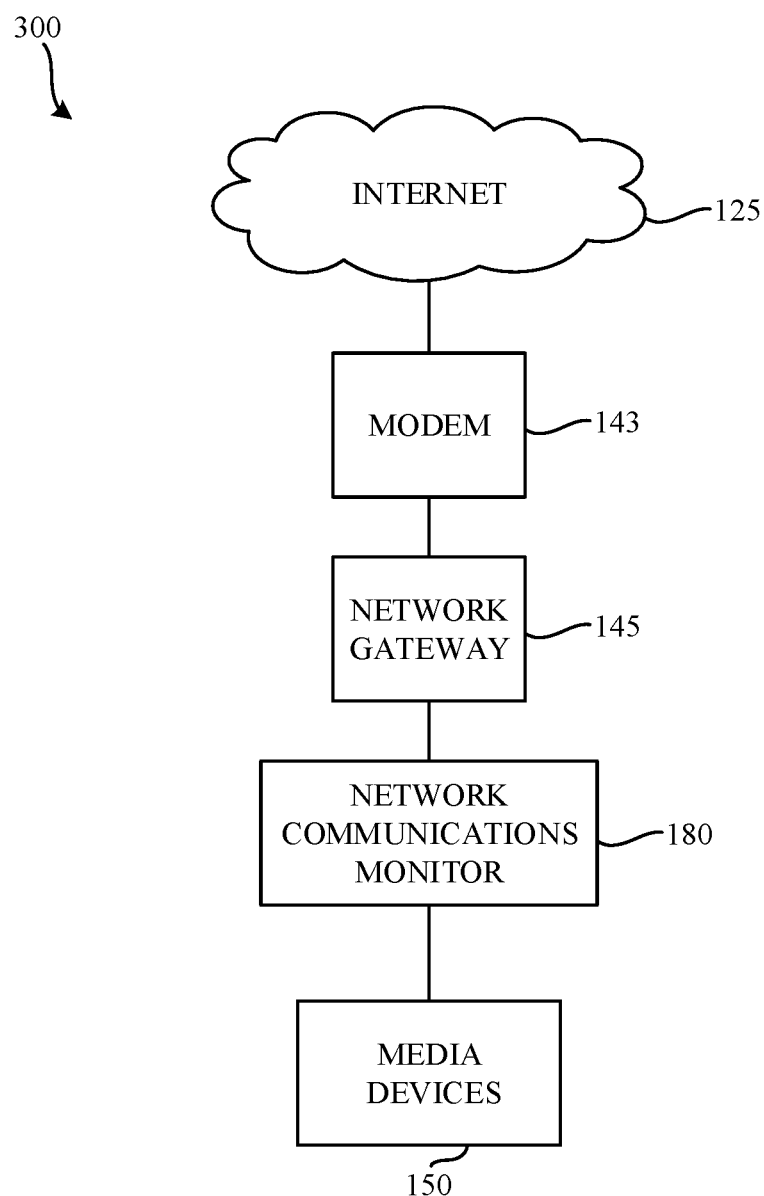
FIG. 3 is a block diagram of a third example configuration of the LAN shown in FIG. 1.

FIG. 3 is a block diagram of a third example configuration 300 of the LAN shown in FIG. 1. In the example configuration 300 of FIG. 3, the network communications monitor 180 is placed between the network gateway 145 and the media devices 150. Thus, the modem 143 communicates with the network gateway 145. The network gateway 145 communicates with the media devices 150, and those communications pass through the network communications monitor 180.

In the illustrated example of FIG. 3, the network communications monitor 180 monitors communications between the network gateway 145 and the media devices 150. In some examples, the network communications monitor 180 is a network routing device (e.g., a router, a switch, a hub, etc.) that monitors network communications. In the illustrated example, because the modem 143 and the network gateway 145 are adjacent, they may be combined into a single device. For example, a combined gateway and modem device may additionally or alternatively be used. In some examples, the network communications monitor 180 is additionally or alternatively integrated in the network gateway and/or in the modem 143.

Figure 4:
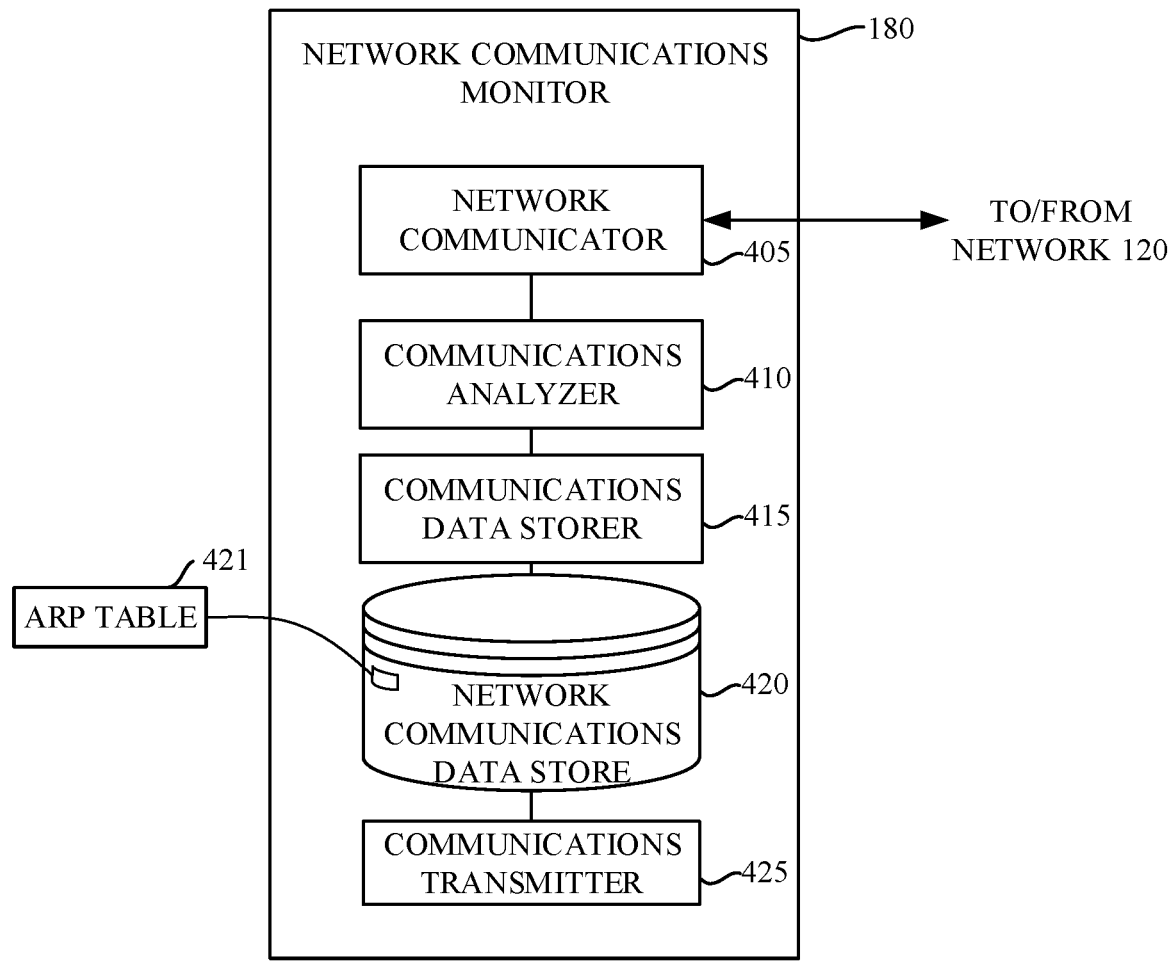
FIG. 4 is a block diagram of an example implementation of the network communications monitor FIG. 1.

FIG. 4 is a block diagram of an example implementation of the network communications monitor 180 FIG. 1. The example network communications monitor 180 of FIG. 4 includes a network communicator 405, a communications analyzer 410, a communications data storer 415, a network communications data store 420, and a communications transmitter 425.

The network communicator 405 of the illustrated example of FIG. 4 is an Ethernet interface. In the illustrated example, the network communicator 405 receives network communications (e.g., HTTP requests, etc.) from the LAN 120. While in the illustrated example, the network communicator 405 is an Ethernet interface, any other type of interface may additionally or alternatively be used. For example, the network communicator 405 might include one or more of a Bluetooth interface, a WiFi interface, a digital subscriber line (DSL) interface, a T1 interface, etc. While in the illustrated example a single network communicator 405 is shown, any number and/or type(s) of network communicators may additionally or alternatively be used. For example, both a wired network communicator and a wireless network communicator may be used. In examples disclosed herein, the network communicator 405 may be referred to as example means for communicating.

The communications analyzer 410 of the illustrated example of FIG. 4 inspects network communications received by the network communicator 405. In the illustrated example, the communications analyzer 410 filters network communications received by the network communicator 405 to identify network communications of the media devices 150. In examples disclosed herein, the communications analyzer 410 identifies the media device 150 by determining a network address (e.g., an IP address) of the media device 150. Further, the communications analyzer 410 performs a lookup of the hardware address (e.g., the MAC address) of the media device 150 using the ARP table 421. In examples disclosed herein, the media device 150 may be unidentified and/or otherwise unknown and, as such, the communications analyzer 410 may determine the media device 150 is not identifiable using the MAC address. For example, the communications analyzer 410, upon identifying an IP address of a network communication, performs an ARP lookup to determine the MAC address associated with the IP address. The communications analyzer 410 then determines whether the MAC address is previously known. In the event the communications analyzer 410 determines the MAC address is not previously known (e.g., is it associated with a new media device 150, etc.), the communications analyzer 410 communicates with the communications data storer 415 to store the unknown and/or otherwise unidentified MAC address in the network communications data store 420. In such an example, the communications data storer 415 stores the unknown and/or otherwise unidentified MAC address with an indicator, flag, etc., identifying the stored MAC address is unknown and/or otherwise identified. In examples disclosed herein, responsive to obtaining identification data of the unknown device, the communications data storer 415 may remove the corresponding indicator, flag, etc. In examples disclosed herein, the communications data storer 415 additionally stores the associated IP address.

In examples disclosed herein, the example communications analyzer 410 passively monitors communications occurring on the LAN 120 to identify addresses currently in use (e.g., addresses associated with communications that occurred within a threshold period of time such as the last hour, the last day, the last week, etc.). However, in some examples, the example communications analyzer 410 may actively identify addresses in use on the LAN 120 by, for example, scanning a range of IP addresses, querying a DHCP server to identify IP addresses that have been leased, etc. In examples disclosed herein, the communications analyzer 410 may be referred to as example means for analyzing.

The communications data storer 415 of the illustrated example of FIG. 4 stores network communications identified by the communications analyzer 410 in the network communications data store 420. For example, the communications data storer 415 stores the MAC address of an unidentified and/or otherwise unknown device, determined by the communications analyzer 410, in the network communications data store 420. In the illustrated example, network communications identified by the communications analyzer 410 are stored in association with the media device(s) 150 identified as receiving and/or transmitting network communications. In examples disclosed herein, the data storer 415 may be referred to as example means for storing.

The network communications data store 420 of the illustrated example of FIG. 4 may be any device for storing data such as, for example, flash memory, magnetic media, optical media, etc. Furthermore, the data stored in the network communications data store 420 may be in any data format such as, for example, binary data, comma delimited data, tab delimited data, structured query language (SQL) structures, etc. While, in the illustrated example, the network communications data store 420 is illustrated as a single database, the network communications data store 420 may be implemented by any number and/or type(s) of databases. In the illustrated example, the network communications data store 420 stores the MAC address of an unidentified and/or otherwise unknown media device 150. In the illustrated example, the network communications data store 420 also stores an ARP table 421 that includes mapping information between a network address (e.g., an IP address) and a hardware address (e.g., a MAC address) presently using the corresponding network address. An example implementation of the ARP table 421 is further described in connection with FIG. 5. In examples disclosed herein, the network communications data store 420 may be referred to as example means for data storing.

The communications transmitter 425 of the illustrated example of FIG. 4 transmits network communications data stored in the network communications data store 420. The communications transmitter 425 of the illustrated example periodically and/or aperiodically transmits network communications data from the network communications data store 420 to the network activity measurement system 110. For example, the communications transmitter 425 transmits an unidentified and/or otherwise unknown MAC address to the network activity measurement system 110. In examples disclosed herein, the communications transmitter 425 waits for a response from the network activity measurement system 110 to determine whether the unidentified and/or otherwise unknown device has been identified.

In the illustrated example, the communications transmitter 425 transmits the network communications data via the LAN 120 and the Internet 125. However, the communications transmitter 425 may transmit network communications data via any other communication medium. For example, the network communications monitor 180 may be physically mailed to the network activity measurement system 110 and the communications transmitter 425 might transmit network communications data via, for example, a USB connection, a Bluetooth connection, a serial connection, a local area network (LAN), etc. In examples disclosed herein, the communications transmitter 425 may be referred to as example means for transmitting.

In operation, the example communications analyzer 410 monitors, via the network communicator 405, communications occurring on and/or involving a LAN 120 (e.g., a home network). The example communications data storer 415 stores the communications in the network communications data store 420. The communications transmitter 425 periodically and/or aperiodically transmits the stored communications to the network activity measurement system 110.

In examples disclosed herein, the network communicator 405, the communications analyzer 410, the communications data storer 415, the network communications data store 420, and the communications transmitter 425 are implemented within the media exposure measurement location 140 of FIG. 1. Alternatively, in some examples disclosed herein, any of the the network communicator 405, the communications analyzer 410, the communications data storer 415, the network communications data store 420, and/or the communications transmitter 425 may be implemented in a location separate from the media exposure measurement location 140.

FIG. 5 is an example address resolution protocol (ARP) table 421 that may be stored by the example network communications data store of the example network communications monitor 180 of FIGS. 1, 2, 3, and/or 4 to associate an Internet protocol (IP) address with a hardware address (e.g., a media access control (MAC) address). The example ARP table 421 is maintained by the network communicator 405. The ARP table 421 is updated by the network communicator 405 as IP addresses of media devices change (e.g., new IP addresses are issued via DHCP).

The example ARP table 421 of FIG. 5 includes an IP address column 560 and a MAC address column 565. In the illustrated example, the IP address column 560 represents an IP version 4 (IPv4) addresses of media devices on the LAN. However, any other type of address may additionally or alternatively be used such as, for example, an IPv6 address. In the illustrated example, the MAC address column 565 represents MAC addresses of media devices on the LAN. However, any other type of address may additionally or alternatively be used. Each row of the ARP table 421 of FIG. 5 represents a specific media device (i.e., the IP address and MAC address of a single media device).

The example ARP table 421 of the illustrated example of FIG. 5 includes five rows respectively associated with five different media devices on the LAN. A first row 571 corresponds to the first media device 151. A second row 572 corresponds to the second media device 152. A third row 573 corresponds to the third media device 153. A fourth row 574 corresponds to the fourth media device 154. A fifth row 575 corresponds to the fifth media device 155. In the illustrated example, the first six characters of the MAC address (described above as the OUI) of the third row 573 and the fourth row 574 are the same (e.g., "4C:B1:99"). In the illustrated example, the matching OUI indicates that the third media device 153 and the fourth media device 154 are of the same manufacturer and/or model. Though the MAC addresses include an OUI, identification data associated with the OUI may be unknown. Accordingly, examples disclosed herein determine such identification data.

Figure 6:
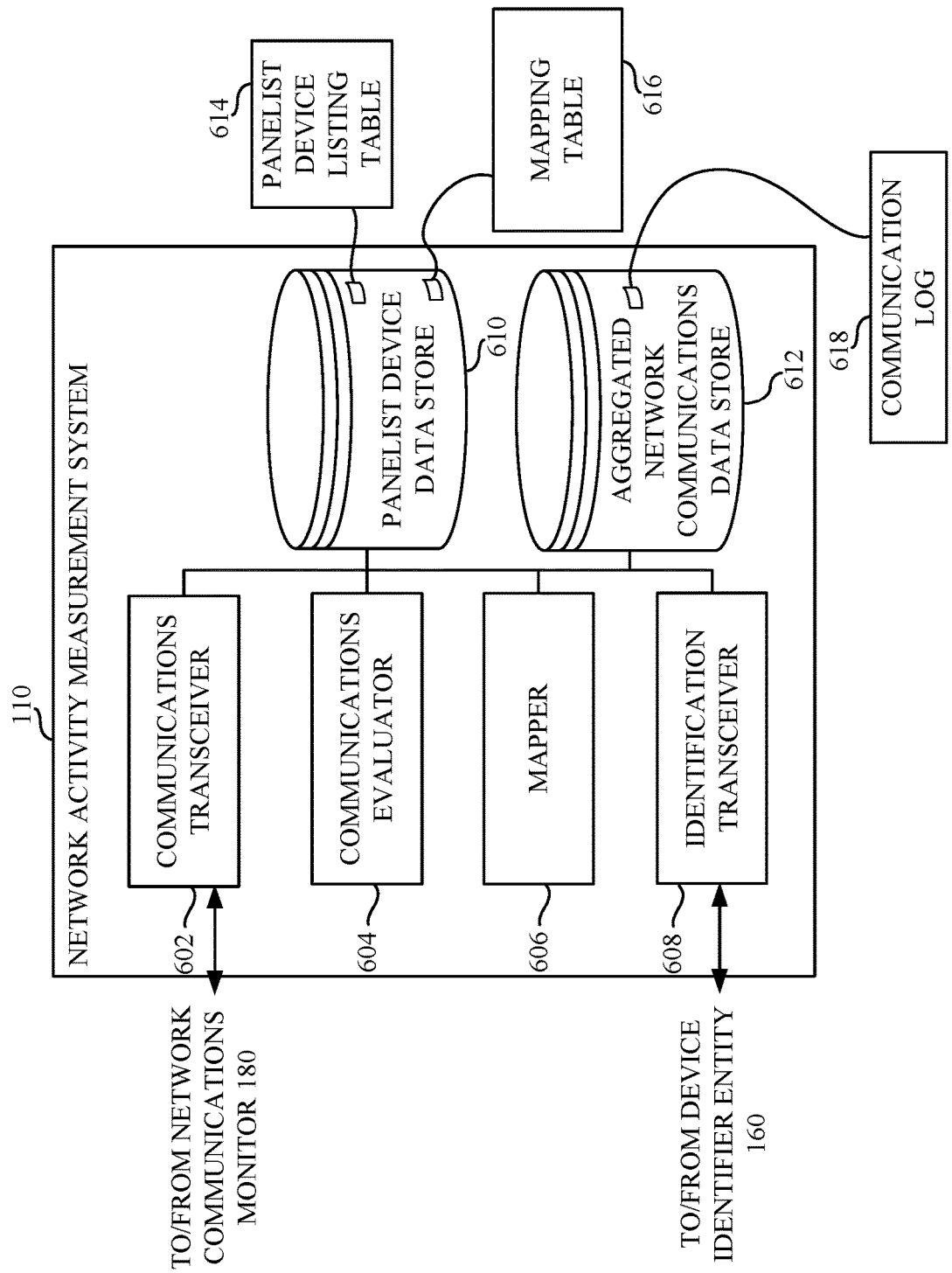
FIG. 6 is a block diagram of an example implementation of the example network activity measurement system of FIG. 1.

FIG. 6 is a block diagram of an example implementation of the example network activity measurement system 110 of FIG. 1. The example network activity measurement system 110 of FIG. 6 includes an example communications transceiver 602, an example communications evaluator 604, an example mapper 606, an example identification transceiver 608, an example panelist datastore 610, and an example aggregated network communications data store 612.

The example communications transceiver 602 of the illustrated example of FIG. 6 receives network communications from the network communications monitor 180 of FIG. 4. In the illustrated example, the communications transceiver 602 is implemented by a server which receives the network communications from the network communications monitor 180 via a network interface (e.g., an Ethernet connection). However, the communications transceiver 602 may receive the network communications from the network communications monitor 180 via any other type of interface such as, for example, a universal serial bus (USB) connection, a Bluetooth connection, etc. In examples disclosed herein, the communications transceiver 602 may be referred to as example means for network communicating.

In examples disclosed herein, the network communications received by the communications transceiver 602 include hardware addresses (e.g., MAC addresses) of devices that are unidentified and/or otherwise unknown in the media exposure measurement location 140 of FIGS. 1, 2, 3 and/or 4. Alternatively, the communications transceiver 602 may receive any suitable network communications from the network communications monitor 180 (e.g., network addresses, hardware addresses, etc.). The communications transceiver 602 of the illustrated example stores the received network communications in the aggregated network communications data store 612. In such examples, the communications transceiver 602 stores the received network communications as an example communication log 618 of the aggregated network communications data store 612.

The communications evaluator 604 of the illustrated example of FIG. 6 analyzes communications from the network devices 150 (received via the network communications monitor 180 and the communications transceiver 602). The example communications evaluator 604 of FIG. 6 is implemented by a server which analyzes the communications from the media devices 150 stored in the communication log 618 to determine, for example, whether a received hardware address (e.g., MAC address) is associated with a known device. For example, the communications evaluator 604 may communicate with the mapping table 616 stored in the panelist device data store 610 to identify whether the hardware address (e.g., the MAC address) has been previously identified or whether identifying data (e.g., device metadata) is available in connection with the hardware address (e.g., the MAC address). In some examples disclosed herein, the communications evaluator 604 determines ownership and/or usage statistics of the media devices 150, relative rankings of usage and/or ownership of media devices 150, type(s) of uses of media devices 150 (e.g., whether a device is used for browsing the Internet, streaming media from the Internet, etc.), and/or other type(s) of network device information.

In some examples disclosed herein, the example communications evaluator 604 utilizes the mapping table 616 stored in the panelist device data store 610 to connect a MAC address of a network communication stored in the communication log 618 with a device name and, in some examples, with identification data provided by either the device identifier entity 160 and/or the panelist (e.g., a location of the device in the media exposure measurement location 140, a primary user of the device, device metadata, etc.). When used in combination, such information may be used to determine whether, for example, a particular program is more commonly viewed at a particular location in the media exposure measurement location 140 (e.g., child oriented media is more commonly viewed in a family room as opposed to a basement, etc.). In examples disclosed herein, the communications evaluator 604 may be referred to as example means for evaluating.

The example mapper 606 of the illustrated example of FIG. 6 receives a list of device names from the identification transceiver 608 and maps each of the named devices to a MAC addresses of a device present on the LAN 120. In operation, the mapper 606 is configured to generate and/or otherwise update the mapping table 616 to include a relationship between identification data (e.g., device make, device model, device metadata, etc.) and hardware address (e.g., MAC address). In some examples disclosed herein, the communications evaluator 604 identifies that the device name can be resolved based on the hardware address (e.g., the MAC address) and, as such, the mapper 606 can translate the MAC address into a device name for the communications evaluator 604. In other examples disclosed herein, the mapper 606 may update the mapping table 616 responsive to any identification data (e.g., device make, device model, device metadata, etc.) obtained by the identification transceiver 608. For example, in the event the communications evaluator 604 is unable to resolve the device name based on the hardware address (e.g., the MAC address), the mapper 606 waits until identification data (e.g., device make, device model, device metadata, etc.) is obtained to update the hardware address and device name relationship in the mapping table 616. In examples disclosed herein, the mapper 606 may be referred to as example means for mapping.

In the example illustrated in FIG. 6, the identification transceiver 608 is configured to communicate with the device identifier entity 160 to provide the hardware address of devices that are unidentifiable and/or otherwise unknown. For example, in the event the communications evaluator 604 determines the hardware address is not associated with identification data (e.g., device make, device model, device metadata, etc.) in the mapping table 616, the identification transceiver 608 transmits such an unidentified and/or otherwise unknown hardware address to the device identifier entity 160. In some examples disclosed herein, the communications evaluator 604 parses the hardware address (e.g., the MAC address) to identify the OUI. Accordingly, in such examples disclosed herein, the identification transceiver 608 transmits the OUI to the device identifier entity 160. Responsive to obtaining a result from the device identifier entity 160, the identification transceiver 608 provides such a result to the mapper 606. In such examples, the mapper 606 either updates the mapping table 616 with the newly identified identification data (e.g., device make, device model, device metadata, etc.) or indicates in the mapping table 616 that device identification was unsuccessful. In examples disclosed herein, the identification transceiver 608 may be referred to as example means for data communicating.

The example panelist device data store 610 of the illustrated example of FIG. 6 may be implemented by any type(s) and/or number of device(s) and/or storage disks for storing data such as, for example, flash memory, magnetic media, optical media, etc. Furthermore, the data stored in the example panelist device data store 610 may be in any data format(s) such as, for example, binary data, comma delimited data, tab delimited data, structured query language (SQL) structures, etc. While, in the illustrated example, the panelist device data store 610 is illustrated as a single database, the panelist device data store 610 may be implemented by any number and/or type(s) of databases. In the illustrated example, the example panelist device data store 610 stores a panelist device listing table 614 and a mapping table 616. In examples disclosed herein, the panelist device data store 610 may be referred to as example means for panelist data storing.

The aggregated network communications data store 612 of the illustrated example of FIG. 6 may be implemented by any type(s) and/or number of device(s) and/or storage disks for storing data such as, for example, flash memory, magnetic media, optical media, etc. Furthermore, the data stored in the aggregated network communications data store 612 may be in any data format(s) such as, for example, binary data, comma delimited data, tab delimited data, structured query language (SQL) structures, etc. While, in the illustrated example, the aggregated network communications data store 612 is illustrated as a single database, the aggregated network communications data store 612 may be implemented by any number and/or type(s) of databases. In the illustrated example, the example aggregated network communications data store 612 stores a communication log 618. Records in the example communication log 618 are transmitted to the network activity measurement system 110 by the network communications monitor 180. Data stored in the aggregated network communications data store 612 is aggregated in the sense that it represents an aggregate of network communications data received from each network communications monitor 180. In the illustrated example, for simplicity, the communication log 618 represents communications received from a single network communications monitor 180 (e.g., network communications monitored at a single media exposure measurement location 140). However, in practice, the communication log 618 may represent communications received from multiple network communications monitors 180, associated with many different media exposure measurement locations 140. In examples disclosed herein, the aggregated network communications data store 612 may be referred to as example means for network data storing.

In the illustrated example, the communication log 618 stores information such as, for example, the MAC address of the media device involved in the communication, a timestamp indicating when the network communication occurred, and/or network data representing the network communication (e.g., an HTTP headers of network communications monitored by the network communications monitor 180, an HTTP payload, FTP data, HTTPS data, etc.). However, any other information may additionally or alternatively be stored such as, for example, a payload of the network communication.

FIG. 7A is an example data table that may be stored by the example panelist device data store 610 of FIG. 6 to store a list of panelist devices and additional properties associated therewith. The example panelist device listing table 614 stores a device name (device name column 771) and additional properties of the corresponding device such as, for example, a location of the device (site ID column 772), a type of the device (type column 773), a make of the device (make column 774), a model of the device (model column 775), whether metering and/or monitoring of the network communications device is permitted (metered column 776), whether the device is portable and/or movable (moveable column 777). In some examples, additional information is stored such as, for example, a household identifier and/or an identifier of the network communications monitor 180 to facilitate association of the device(s) with the household (e.g., multiple panelist households may have a device named "tablet", "television", "smartphone", etc.). In the illustrated example of FIG. 7A, the example panelist device listing table 608 includes four rows 781, 782, 783, 784. However, in practice, any number of rows may be used corresponding to a number of device names provided to the network activity measurement system 110. In the example illustrated in FIG. 7A, row 784 corresponds to a device that is unknown and/or otherwise identified. In the event such corresponding identification data becomes available, examples disclosed herein include populating row 784 with the identification data. In other examples disclosed herein, any number of rows may be unidentified and/or otherwise unknown.

FIG. 7B is an example data table that may be stored by the example panelist device data store 610 of FIG. 6 to store a mapping between a MAC address and a device name. The example mapping table 616 stores a MAC address (MAC address column 791) and a device name (device name column 792) corresponding to each mapping. In some examples, additional information such as a time at which the mapping was created, an identifier of the user that entered the mapping, etc. In the illustrated example of FIG. 7B, four mappings are shown 795, 796, 797, 798. However, in practice, any number of mappings may be stored corresponding to a number of mappings. In the example illustrated in FIG. 7B, mapping 795 corresponds to a device that is unknown and/or otherwise identified. In the event such corresponding identification data becomes available, examples disclosed herein include populating mapping 795 with the identification data. In other examples disclosed herein, any number of rows may be unidentified and/or otherwise unknown.

While an example manner of implementing the network communications monitor 180 of FIGS. 1, 2, and/or 3 is illustrated in FIG. 4, an example manner of implementing the network activity measurement system 110 of FIG. 1 is illustrated in FIG. 6, and an example manner of implementing the device identifier entity 160 of FIG. 1 is illustrated in FIG. 1, one or more of the elements, processes and/or devices illustrated in FIGS. 1, 4 and/or 6 may be combined, divided, re-arranged, omitted, eliminated and/or implemented in any other way. Further, the example network communicator 405, the example communications analyzer 410, the example communications data storer 415, the example network communications data store 420, the example communications transmitter 425 and/or, more generally, the example network communications monitor 180 of FIGS. 1, 2, 3, and/or 4, the example communications transceiver 602, the example communications evaluator 604, the example mapper 606, the example identification transceiver 608, the example panelist device data store 610, the example aggregated network communications data store 612, and/or, more generally, the example network activity measurement system 110 of FIGS. 1 and/or 6, and/or the example update agent 162, the example server 164, and/or, more generally, the example device identifier entity 160 of FIG. 1 may be implemented by hardware, software, firmware and/or any combination of hardware, software and/or firmware. Thus, for example, any of the example network communicator 405, the example communications analyzer 410, the example communications data storer 415, the example network communications data store 420, the example communications transmitter 425 and/or, more generally, the example network communications monitor 180 of FIGS. 1, 2, 3, and/or 4, the example communications transceiver 602, the example communications evaluator 604, the example mapper 606, the example identification transceiver 608, the example panelist device data store 610, the example aggregated network communications data store 612, and/or, more generally, the example network activity measurement system 110 of FIGS. 1 and/or 6, and/or the example update agent 162, the example server 164, and/or, more generally, the example device identifier entity 160 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network communicator 405, the example communications analyzer 410, the example communications data storer 415, the example network communications data store 420, the example communications transmitter 425 and/or, more generally, the example network communications monitor 180 of FIGS. 1, 2, 3, and/or 4, the example communications transceiver 602, the example communications evaluator 604, the example mapper 606, the example identification transceiver 608, the example panelist device data store 610, the example aggregated network communications data store 612, and/or, more generally, the example network activity measurement system 110 of FIGS. 1 and/or 6, and/or the example update agent 162, the example server 164, and/or, more generally, the example device identifier entity 160 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network communications monitor 180 of FIGS. 1, 2, 3, and/or 4, the example network activity measurement system 110 of FIGS. 1 and/or 6, and/or the example device identifier entity 160 of FIG. 1 may include one or more elements, processes and/or devices in addition to, or instead of, those illustrated in FIGS. 1, 4 and/or 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
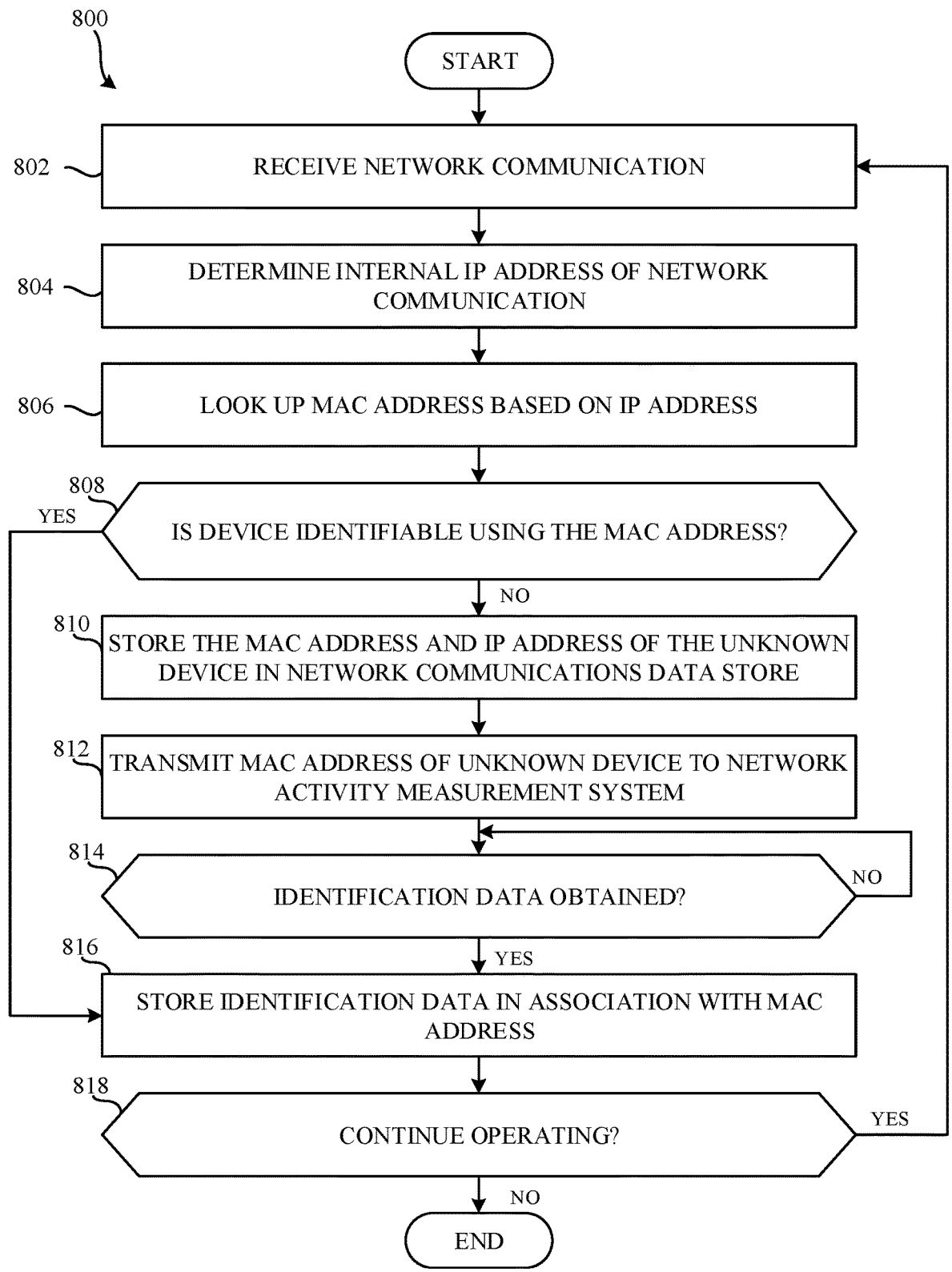
FIG. 8 is a flowchart representative of example machine-readable instructions which may be executed to implement the example network communications monitor of FIGS. 1, 2, 3, and/or 4.
Figure 9:
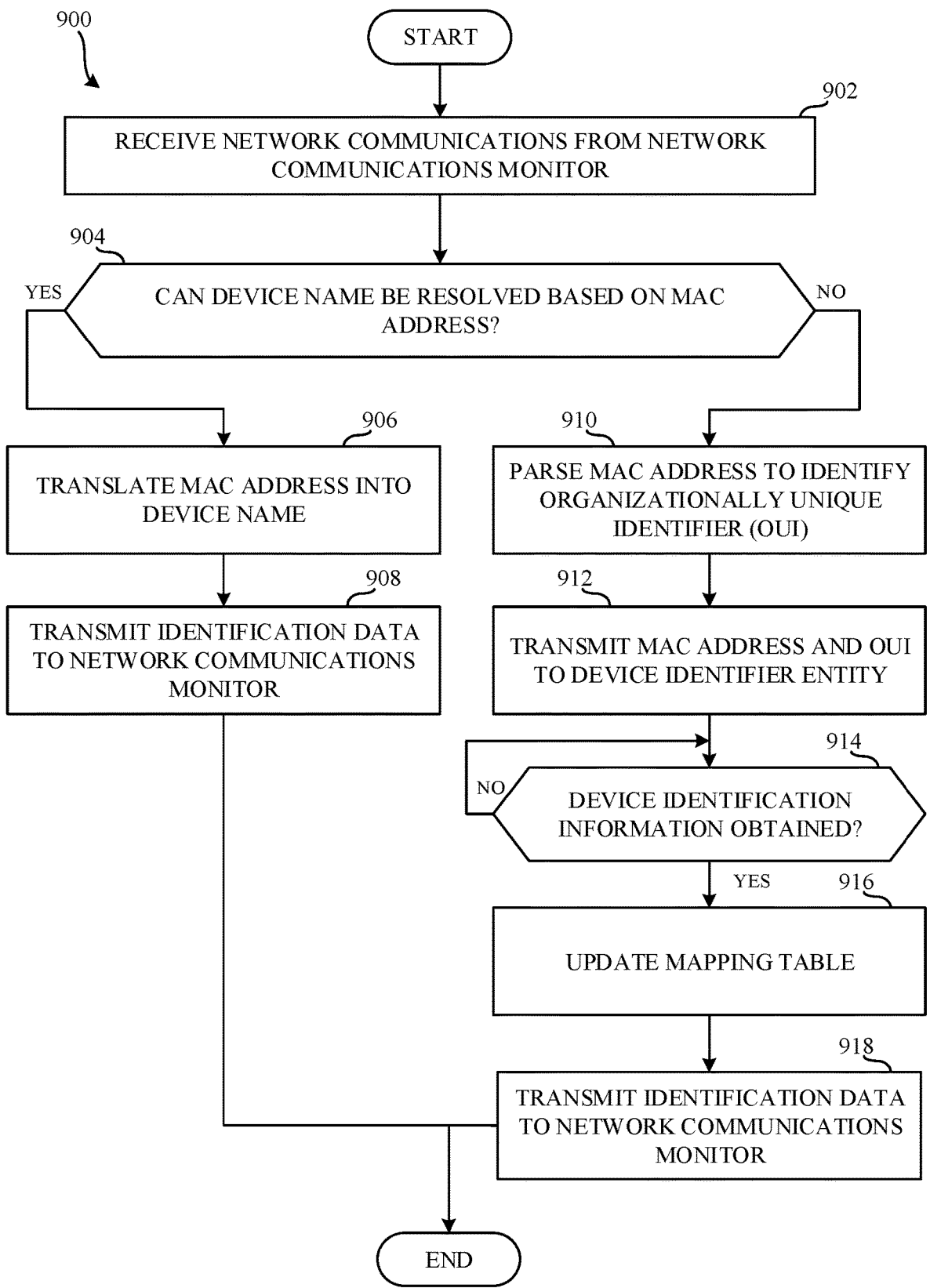
FIG. 9 is a flowchart representative of example machine-readable instructions which may be executed to implement the example network activity measurement system of FIGS. 1 and/or 6.

A flowchart representative of example hardware logic, machine readable instructions, hardware implemented state machines, and/or any combination thereof for implementing the network communications monitor 180 of FIGS. 1, 2, 3, and/or 4 is shown in FIG. 8. A flowchart representative of example hardware logic, machine readable instructions, hardware implemented state machines, and/or any combination thereof for implementing the network activity measurement system 110 of FIGS. 1 and/or 6 is shown in FIG. 9. A flowchart representative of example hardware logic, machine readable instructions, hardware implemented state machine, and/or any combination thereof for implementing the device identifier entity 160 of FIG. 1 is show in FIG. 10. In these examples, the machine readable instructions may be one or more executable programs or portion(s) of an executable program for execution by a computer processor such as the processor 1112 shown in the example processor platform 1100 discussed below in connection with FIG. 11, the processor 1212 shown in the example processor platform 1200 discussed below in connection with FIG. 12, or the processor 1312 shown in the example processor platform 1300 discussed below in connection with FIG. 13. The program(s) may be embodied in software stored on a non-transitory computer readable storage medium such as a CD-ROM, a floppy disk, a hard drive, a DVD, a Blu-ray disk, or a memory associated with the processor 1112, a memory associated with the processor 1212, or a memory associated with the processor 1312, but the entire program and/or parts thereof could alternatively be executed by a device other than the processor 1112, the processor 1212, the processor 1312, and/or embodied in firmware or dedicated hardware. Further, although the example program is described with reference to the flowcharts illustrated in FIGS. 8, 9, and/or 10, many other methods of implementing the example network communications monitor 180 of FIGS. 1, 2, 3, and/or 4, the example network activity measurement system 110 of FIGS. 1 and/or 6, and/or the example device identifier entity 160 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 8, 9, and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of example machine-readable instructions 800 which may be executed to implement the example network communications monitor 180 of FIGS. 1, 2, 3, and/or 4. The machine-readable instructions 800 of FIG. 8 begin execution when the network communicator 405 receives network communications. (Block 802). In the illustrated example, the network communicator 405 receives network communications sent to and/or from a device (e.g., the device 150) on the LAN 120.

The communications analyzer 410 then determines the internal IP address of the media device involved in the network communication. (Block 804). In some examples, the media device may be the source (e.g., the originator) of the network communication, while in some other examples the media device may be the destination of the network communication. In the illustrated example, the communications analyzer 410 identifies the IP address by selecting an internal IP address involved in the communications. In some examples, the network communication may involve both a source and a destination that are internal to the LAN 120 (e.g., a first media device on the LAN communicates with a second media device on the LAN). In such examples, the communications analyzer 410 may ignore the network communication. However, in some examples, the communications analyzer 410 may select the IP address of the source of the network communication as the IP address.

The communications analyzer 410 then performs a lookup of the MAC address based on the IP address (block 806). In the illustrated example, the communications analyzer 410 performs the lookup via the ARP table 421. The ARP table is maintained by the example network communicator 405 of the network communications monitor 180. However, any other approach to determining the MAC address of the IP address associated with the network communications may be used.

At block 808, the example communications analyzer 410 determines whether the device is identifiable using the MAC address. (Block 808). For example, the communications analyzer 410 may compare the identified MAC address with a list of known MAC addresses stored in the communications data storer 415. In the event the communications analyzer 410 determines the MAC address is a known MAC address (e.g., the control of block 808 returns a result of YES), the communications data storer 415 stores the data identifying the network communication in association with the MAC address in the network communications data store 420. (Block 816). For example, the communications analyzer 410 may determine the MAC address is a known MAC address if the MAC address matches a MAC address previously identified and stored in the network communications data store 420.

Alternatively, in the event the communications analyzer 410 determines the MAC address is not identifiable (e.g., the control of block 808 returns a result of NO), the data storer stores the MAC address and associated IP address of the unknown and/or otherwise unidentified device in the network communications data store 420. (Block 810). In addition, the communications transmitter 425 transmits the MAC address of the unknown and/or otherwise unidentified device to the network activity measurement system 110 of FIG. 1. (Block 812). In this manner, the network communications monitor 180 determines whether the identification data (e.g., device make, device model, device metadata, etc.) is obtained. (Block 814). In response to the network communications monitor 180 determining that the identification data (e.g., device make, device model, device metadata, etc.) is not obtained (e.g., the control of block 814 returns a result of NO), the network communications monitor 180 continues to wait. For example, the network communications monitor 180 may wait until receiving communications from the network activity measurement system 110. Alternatively, in response to the network communications monitor 180 determining that the identification data (e.g., device make, device model, device metadata, etc.) is obtained (e.g., the control of block 814 returns a result of YES), the communications data storer 415 stores the data identifying the network communication in association with the MAC address in the network communications data store 420. (Block 816).

At block 818, the network communications monitor 180 determines whether to continue operating. (Block 818). In the event the network communications monitor 180 determines to continue operating (e.g., the control of block 818 returns a result of YES), the network communicator 405 receives network communications. (Block 802). For example, the network communications monitor 180 may determine to continue operating in the event additional network communications are available, a request to re-scan the environment 100 has been received, etc. Alternatively, in the event the network communications monitor 180 determines not to continue operating (e.g., the control of block 818 returns a result of NO), the process stops. For example, the network communications monitor 180 may determine not to continue operating in response to a loss of power, no new devices identified, etc.

FIG. 9 is a flowchart representative of example machine-readable instructions 900 which may be executed to implement the example network activity measurement system 110 of FIGS. 1 and/or 6. In FIG. 9, the example communications transceiver 602 of the illustrated example of FIG. 6 receives network communications from the network communications monitor 180 of FIG. 4. (Block 902). In response, the communications evaluator 603 determines whether the device name can be resolved based on the MAC address. (Block 904). For example, the communications evaluator 604 may communicate with the mapping table 616 stored in the panelist device data store 610 to identify whether the hardware address (e.g., the MAC address) has been previously identified.

In the event the communications evaluator 604 determines the device name can be resolved based on the MAC address (e.g., the control of block 904 returns a result of YES), the mapper 606 translates the MAC address into the device name. (Block 906). In examples disclosed herein, the mapper 606 further updates the mapping table 616 to ensure the proper device information is associated with the MAC address. In response, the communications transceiver 602 transmits the device identification to the network communications monitor 180. (Block 908). In some examples disclosed herein, the communications transceiver 602 additionally transmits the mapping table 616, or a copy of the mapping table 616, to the network communications monitor 180.

In the event the, communications evaluator 604 determines the device name cannot be resolved based on the MAC address (e.g., the control of block 904 returns a result of NO), the communications evaluator 604 parses the MAC address to identify the OUI. (Block 910). In response, the identification transceiver 608 transmits the MAC address and OUI to the device identifier entity 160. (Block 912). The identification transceiver 608 then determines whether the device identification information has been obtained from the device identifier entity 160. (Block 914). In the event the identification transceiver 608 determines the identification information has not been obtained (e.g., the control of block 914 returns a result of NO), the identification transceiver 608 continues to wait. In some examples, the identification transceiver 608 may obtain an indication of failure to identify a device from the device identifier entity 160. In this event, the communications transceiver 602 transmits an indication of failure to identify to the network communications monitor 180.

Alternatively, in the event the identification transceiver 608 determines the identification information has been obtained (e.g., the control of block 914 returns a result of YES), the mapper 606 updates the mapping table 616 to associate the identification information of the MAC address. (Block 916).

Additionally, the communications transceiver 602 transmits the device identification information to the network communications monitor 180. (Block 918). The process then stops.

Figure 10:
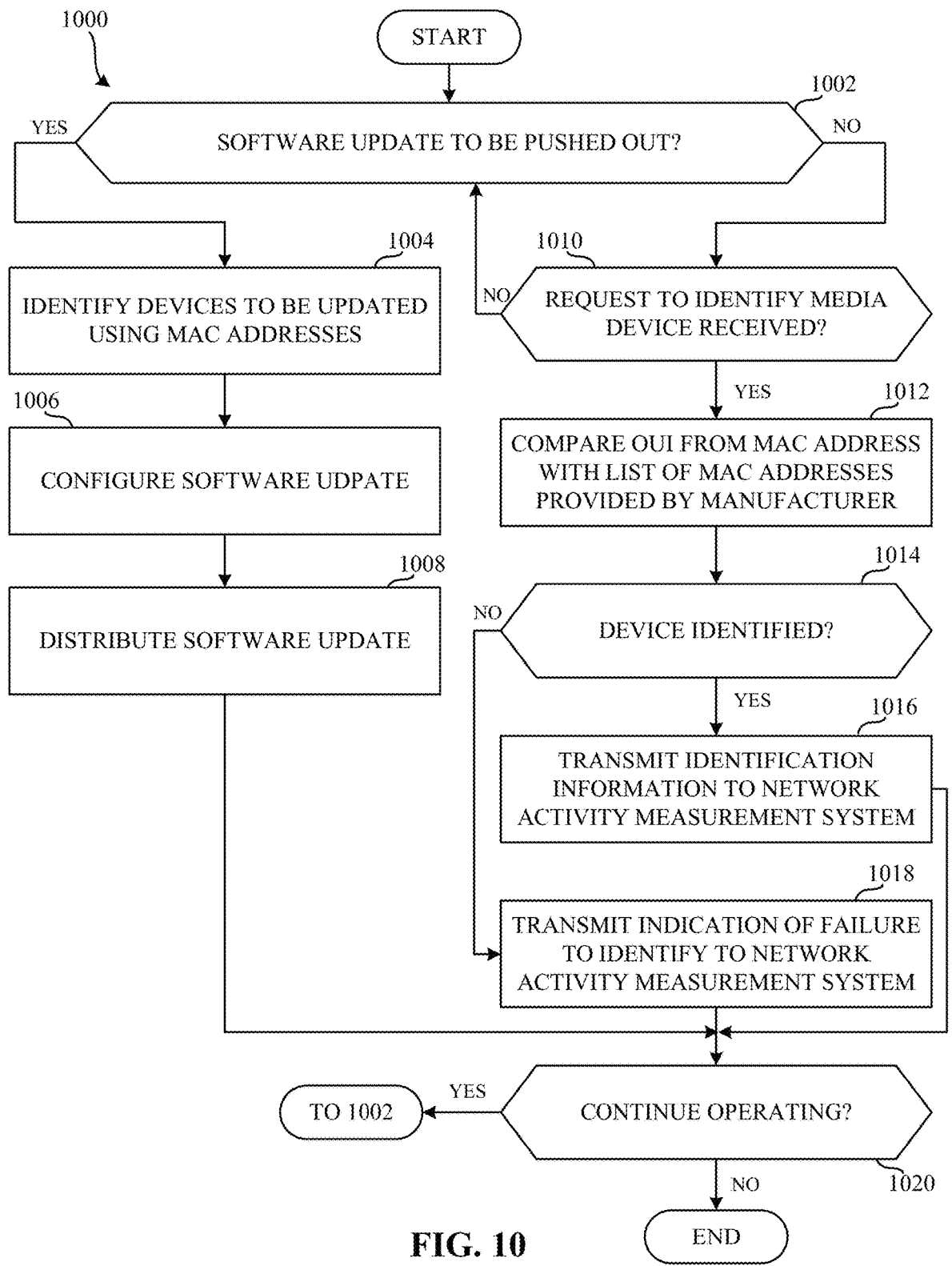
FIG. 10 is a flowchart representative of example machine-readable instructions which may be executed to implement the example device identifier entity of FIG. 1.

FIG. 10 is a flowchart representative of example machine-readable instructions 1000 which may be executed to implement the example device identifier entity 160 of FIG. 1. In FIG. 10, the example update agent 162 of FIG. 1 determines whether a software update is to be pushed out. (Block 1002). For example, the update agent 162 may determine that a software update is to be pushed out in the event a software update is scheduled, a device manufacturer requests a software update, etc. While FIG. 10 is described in connection with whether a software update is to be pushed out, in other examples disclosed herein, the update agent 162 may determine whether any suitable coherent data management service is to be performed (e.g., a firmware update, etc.).

In the event the update agent 162 determines that a software update is to be pushed out (e.g., block 1002 returns a result of YES), then the update agent 162 identifies devices to be updated using the MAC addresses. (Block 1004). For example, the update agent 162 determines, based on the scheduled update or the update requested by the device manufacturer, the MAC address of the subset of media devices to be updated.

In response, the update agent 162 configures the software update for use by the server 164. (Block 1006). Once configured, the server 164 distributes the software update to the corresponding media devices. (Block 1008).

Turning back to block 1002, in the event the update agent 162 determines that there is no software update to be pushed out (e.g., the control of block 1002 returns a result of NO), the update agent 162 determines whether a request to identify a media device has been received. (Block 1010). In the event the update agent 162 determines there is no request to identify a media device (e.g., block 1010 returns a result of NO), the process returns to block 1002.

Alternatively, in the event the update agent 162 determines there is a request to identify a media device (e.g., block 1010 returns a result of YES), then the update agent 162 compares the OUI from the received MAC address with the list of MAC addresses previously stored on the device identifier entity. (Block 1012). In response, the update agent 162 determines whether a device was successfully identified. (Block 1014). For example, a device may be successfully identified in the event the update agent 162 has the same MAC address previously provided by the device manufacturer.

In the event the update agent 162 determines that a device was identified (e.g., block 1014 returns a result of YES), the server 164 transmits the identification information to the network activity measurement system 110 of FIG. 1. (Block 1016). In the event the update agent 162 determines that a device was not identified (e.g., block 1014 returns a result of NO), the server 164 transmits an indication of failure to identify to the network activity measurement system 110 of FIG. 1. (Block 1018).

In response to the execution of the control illustrated in block 1008, block 1016, or block 1018, the update agent 162 determines whether to continue operating. (Block 1020). For example, the update agent 162 may determine to continue operating in the event another software update is scheduled to occur, etc. Accordingly, when the update agent 162 determines to continue operating (e.g., block 1020 returns a result of YES), the process returns to block 1002. Alternatively, in the event the update agent 162 determines not to continue operating (e.g., block 1020 returns a result of NO), the process stops. The update agent 162 may determine not to continue operating if, for example, a loss of power occurs, no additional software updates are scheduled to occur, etc.

Figure 11:
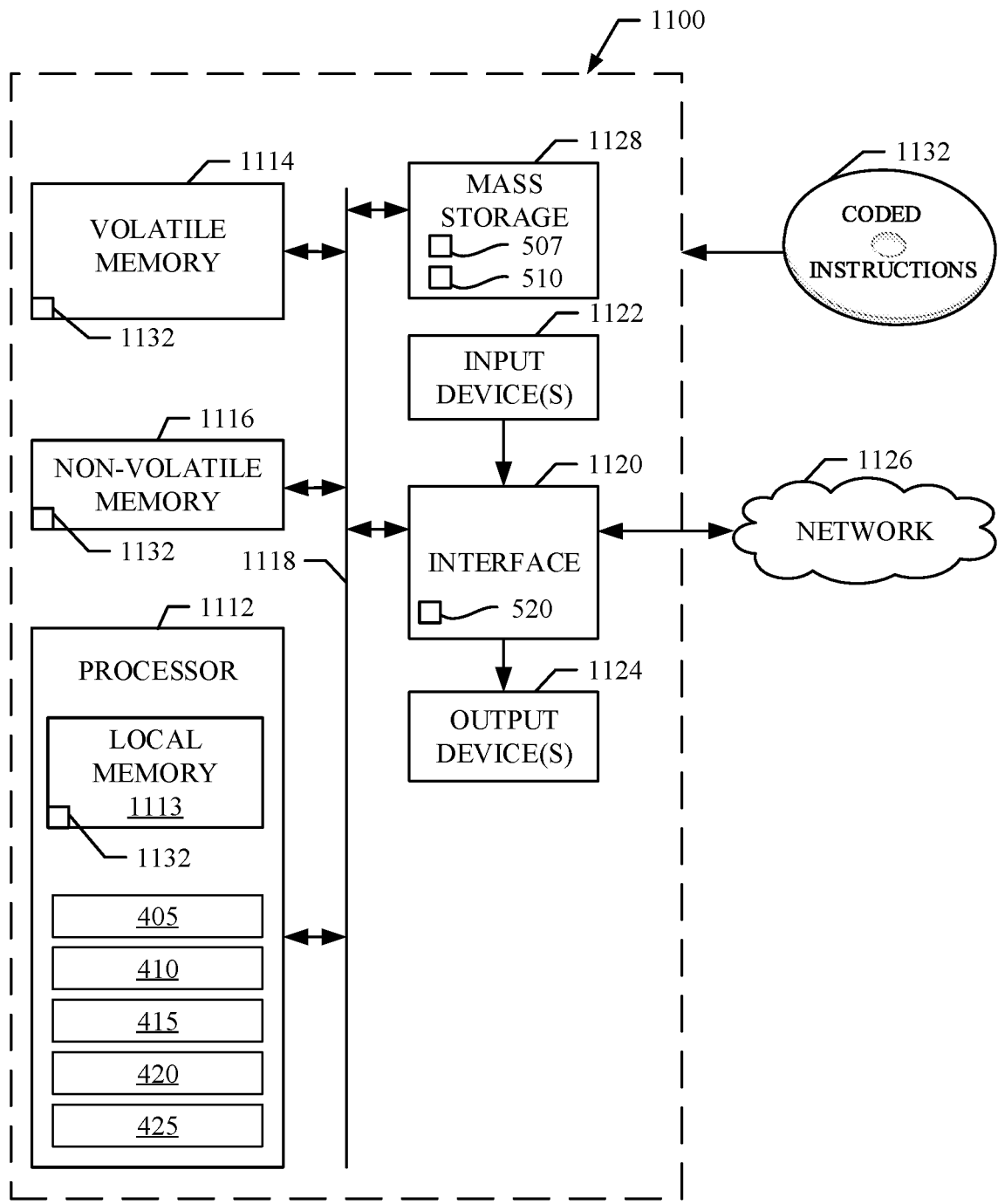
FIG. 11 is a block diagram of an example processor platform structured to execute the instructions of FIG. 8 to implement the network communications monitor of FIGS. 1, 2, 3, and/or 4.

FIG. 11 is a block diagram of an example processor platform 1100 structured to execute the instructions of FIG. 8 to implement the network communications monitor 180 of FIGS. 1, 2, 3, and/or 4. The processor platform 1100 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network communicator 405, the example communications analyzer 410, the example communications data storer 415, the example network communications data store 420, the example communications transmitter 425 and/or, more generally, the example network communications monitor 180 of FIGS. 1, 2, 3, and/or 4.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 8 may be stored in the mass storage device 1128, in the volatile memory 1114, in the non-volatile memory 1116, and/or on a removable non-transitory computer readable storage medium such as a CD or DVD.

Figure 12:
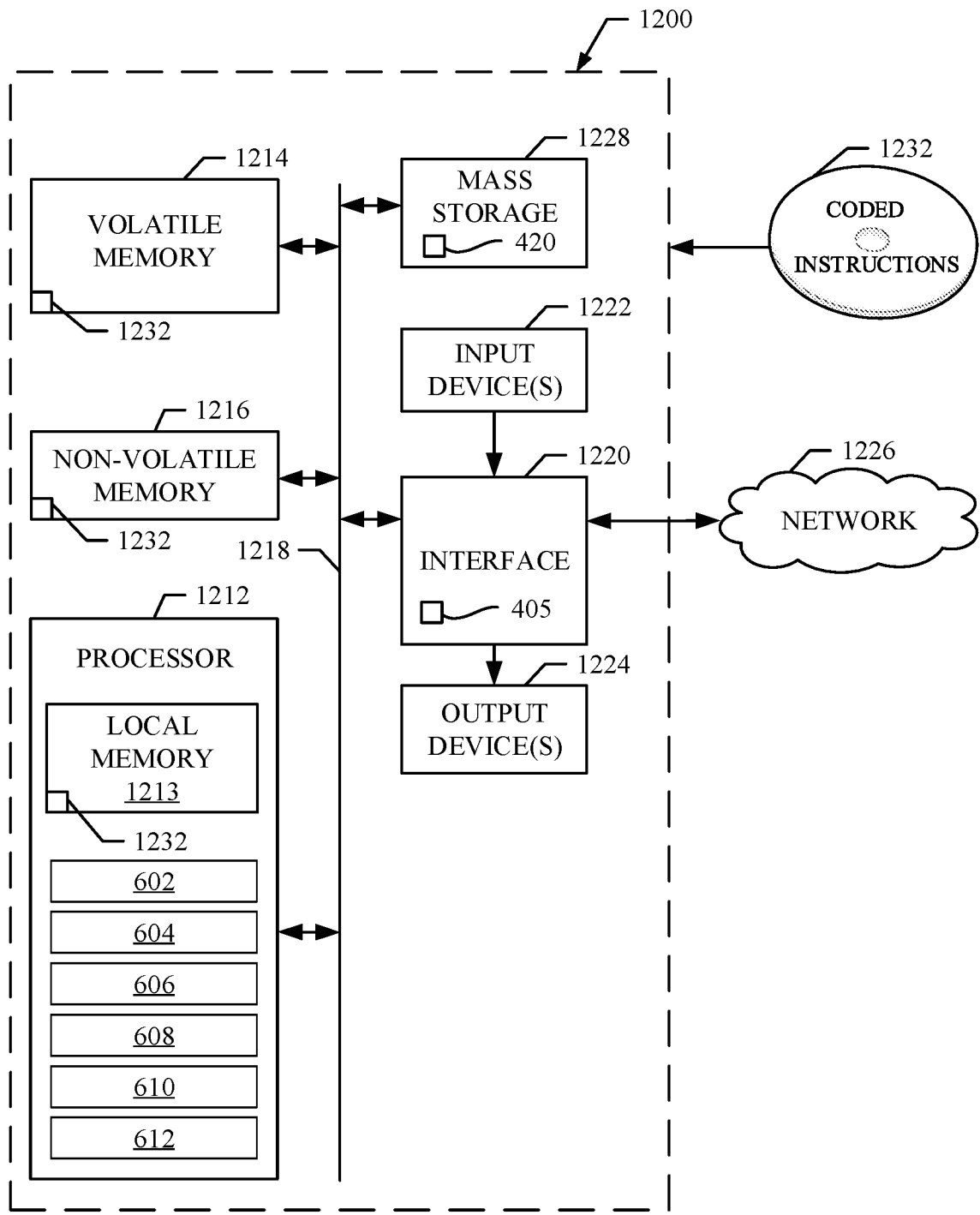
FIG. 12 is a block diagram of an example processor platform structured to execute the instructions of FIG. 9 to implement the network activity measurement system of FIGS. 1 and/or 6.

FIG. 12 is a block diagram of an example processor platform 1200 structured to execute the instructions of FIG. 9 to implement the network activity measurement system 110 of FIGS. 1 and/or 6. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications transceiver 602, the example communications evaluator 604, the example mapper 606, the example identification transceiver 608, the example panelist device data store 610, the example aggregated network communications data store 612 of FIGS. 1 and/or 6.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 9 may be stored in the mass storage device 1228, in the volatile memory 1214, in the non-volatile memory 1216, and/or on a removable non-transitory computer readable storage medium such as a CD or DVD.

Figure 13:
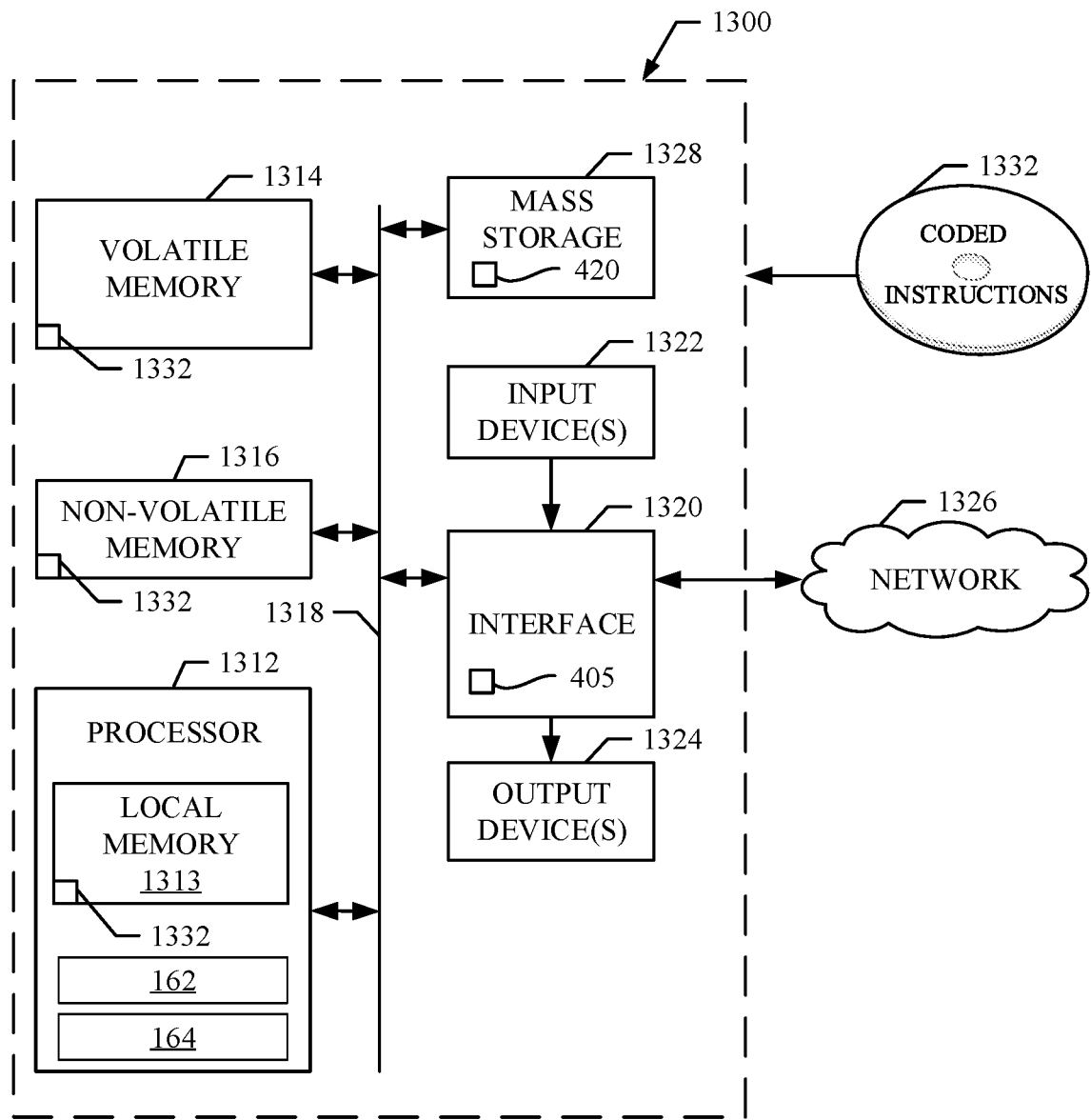
FIG. 13 is a block diagram of an example processor platform structured to execute the instructions of FIG. 10 to implement the device identifier entity of FIG. 1

FIG. 13 is a block diagram of an example processor platform 1300 structured to execute the instructions of FIG. 10 to implement the device identifier entity 160 of FIG. 1. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example update agent 162 and the example server 164 of FIG. 1.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 10 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that facilitate identification of unknown devices. The disclosed methods, apparatus and articles of manufacture improve the efficiency of using a computing device by determining a network address of a device. In examples disclosed herein, the network device is utilized to identify the corresponding hardware device and, as such, the OUI. Examples disclosed herein improve the efficiency of using a computing device by identifying a device using the hardware address. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to facilitate device identification are disclosed herein. Further examples and combinations thereof include the following:

Example 1 includes an apparatus to facilitate device identification, the apparatus comprising a communications analyzer to, responsive to identifying a network address of a media device compare a hardware address associated with the network address of the media device to a list of known hardware addresses, and when the list does not include the hardware address, store the hardware address in a data store, a communications transmitter to transmit the hardware address to a network activity monitoring system, the network activity monitoring system to communicate with a device identifying entity to obtain identification data of the media device based on the hardware address, and a communications data storer to, responsive to obtaining the identifying data from the network activity monitoring system, store the identification data in the data store.

Example 2 includes the apparatus of example 1, wherein the communications analyzer identifies the hardware address of the media device by performing a lookup of the hardware address using the network address and an address resolution protocol table.

Example 3 includes the apparatus of example 1, wherein the communications analyzer, when the list does not include the hardware address, stores the hardware address in the data store with an indicator that it is unknown.

Example 4 includes the apparatus of example 1, further including a network communicator to receive network communications from a local area network, the network communications including the network address.

Example 5 includes the apparatus of example 4, wherein the communications analyzer identifies the network address from the network communications received by the network communicator.

Example 6 includes the apparatus of example 1, wherein at least one of the communications analyzer, the communications transmitter, or the communications data storer is implemented in a media exposure measurement location.

Example 7 includes the apparatus of example 1, wherein the communications analyzer actively identifies network addresses.

Example 8 includes a non-transitory computer readable medium comprising instructions, which, when executed, cause at least one processor to responsive to identifying a network address of a media device compare a hardware address associated with the network address of the media device to a list of known hardware addresses, and when the list does not include the hardware address, store the hardware address in a data store, transmit the hardware address to a network activity monitoring system, the network activity monitoring system to communicate with a device identifying entity to obtain identification data of the media device based on the hardware address, and responsive to obtaining the identifying data from the network activity monitoring system, store the identification data in the data store.

Example 9 includes the non-transitory computer readable medium of example 8, wherein the instructions, when executed, cause the at least one processor to perform a lookup of the hardware address using the network address and an address resolution protocol table to identify the hardware address of the media device.

Example 10 includes the non-transitory computer readable medium of example 8, wherein the instructions, when executed, cause the at least one processor to store the hardware address with an indicator that it is unknown when the list does not include the hardware address.

Example 11 includes the non-transitory computer readable medium of example 8, wherein the instructions, when executed, cause the at least one processor to receive network communications from a local area network, the network communications including the network address.

Example 12 includes the non-transitory computer readable medium of example 11, wherein the instructions, when executed, cause the at least one processor to identify the network address from the network communications received by the network communicator.

Example 13 includes the non-transitory computer readable medium of example 8, wherein the at least one processor is implemented in a media exposure measurement location.

Example 14 includes the non-transitory computer readable medium of example 8, wherein the instructions, when executed, cause the at least one processor to actively identify network addresses.

Example 15 includes a method comprising responsive to identifying a network address of a media device comparing a hardware address associated with the network address of the media device to a list of known hardware addresses, and when the list does not include the hardware address, storing the hardware address in a data store, transmitting the hardware address to a network activity monitoring system, the network activity monitoring system to communicate with a device identifying entity to obtain identification data of the media device based on the hardware address, and responsive to obtaining the identifying data from the network activity monitoring system, storing the identification data in the data store.

Example 16 includes the method of example 15, further including performing a lookup of the hardware address using the network address and an address resolution protocol table to identify the hardware address of the media device.

Example 17 includes the method of example 15, further including storing the hardware address with an indicator that it is unknown when the list does not include the hardware address.

Example 18 includes the method of example 15, further including receiving network communications from a local area network, the network communications including the network address.

Example 19 includes the method of example 18, further including identifying the network address from the network communications received by the network communicator.

Example 20 includes the method of example 15, further including actively identifying identify network addresses.

The following claims are hereby incorporated into this Detailed Description by this reference, with each claim standing on its own as a separate embodiment of the present disclosure.

What is claimed is:

1. An apparatus to facilitate device identification, the apparatus comprising:
   memory; and
   processor circuitry to execute machine readable instructions to at least:
      query a Dynamic Host Configuration Protocol server to identify a network address leased to a media device on a network;
      responsive to identifying the network address of the media device:
         compare a first hardware address associated with the network address of the media device to a list of known hardware addresses; and
         when the list does not include the first hardware address, store the first hardware address in a data store;
      transmit the first hardware address to a network activity monitoring system operated by a media monitoring entity, the network activity monitoring system to determine if identification data of the media device is known to the network activity monitoring system based on the first hardware address and, in response to the network activity monitoring system determining that the identification data is not known to the network activity monitoring system, the network activity monitoring system to communicate with a device identifying entity to obtain the identification data of the media device based on the first hardware address, the media monitoring entity different than the device identifying entity, the identification data of the media device obtained by the device identifying entity parsing the first hardware address to identify an organizationally unique identifier, the device identifying entity to identify the device based on the organizationally unique identifier;
      determine, using the network activity monitoring system of the media monitoring entity, whether the first hardware address has been previously identified based on a mapping table, the mapping table used to translate the identification data determined using the organizationally unique identifier into a device name associated with the media device, the mapping table to identify panelist viewing frequency based on the device name;
      responsive to obtaining the identification data from the network activity monitoring system, store the identification data in the data store;
      determine whether to perform a scheduled software update on the media device based on the stored identification data, the stored identification data used to compare the first hardware address of the media device to a second hardware address corresponding to a subset of media devices to be updated;
      initiate, upon identification of a match between the first hardware address and the second hardware address, the scheduled software update; and
      transmit to the network activity monitoring system, based on whether the match between the first hardware address and the second hardware address is identified, at least one of (1) an identification of the media device determined based on the match, or (2) an indication of a failure to identify the match.

2. The apparatus of claim 1, wherein to identify the first hardware address of the media device, the processor circuitry is to perform a lookup of the first hardware address using the network address and an address resolution protocol table.

3. The apparatus of claim 1, wherein the processor circuitry is to, store, when the list does not include the first hardware address, the first hardware address in the data store with an indicator that the first hardware address is unknown.

4. The apparatus of claim 1, wherein the processor circuitry is to receive network communications from a local area network, the network communications including the network address.

5. The apparatus of claim 4, wherein the processor circuitry is to identify the network address from the network communications received by a network communicator.

6. The apparatus of claim 1, wherein the processor circuitry is located in a media exposure measurement location.

7. A non-transitory computer readable medium comprising instructions, which, when executed, cause at least one processor to:
query a Dynamic Host Configuration Protocol server to identify a network address leased to a media device on a network;
responsive to identification the network address of the media device:
compare a first hardware address associated with the network address of the media device to a list of known hardware addresses; and
when the list does not include the first hardware address, store the first hardware address in a data store;
transmit the first hardware address to a network activity monitoring system operated by a media monitoring entity, the network activity monitoring system to determine if identification data of the media device is known to the network activity monitoring system based on the first hardware address and, in response to determining that the identification data is not known to the network activity monitoring system based on the first hardware address, the network activity monitoring system is to communicate with a device identifying entity to obtain the identification data of the media device based on the first hardware address, the media monitoring entity different than the device identifying entity, the identification data of the media device obtained by the device identifying entity parsing the first hardware address to identify an organizationally unique identifier, the device identifying entity to identify the device based on the organizationally unique identifier;
determine, using the network activity monitoring system of the media monitoring entity, whether the first hardware address has been previously identified based on a mapping table, the mapping table used to translate the identification data determined using the organizationally unique identifier into a device name associated with the media device, the mapping table to identify panelist viewing frequency based on the device name;
responsive to obtaining the identification data from the network activity monitoring system, store the identification data in the data store;
determine whether to perform a scheduled software update on the media device based on the stored identification data, the stored identification data used to compare the first hardware address of the media device to a second hardware address corresponding to a subset of media devices to be updated;
initiate, upon identification of a match between the first hardware address and the second hardware address, the scheduled software update; and
transmit to the network activity monitoring system, based on whether the match between the first hardware address and the second hardware address is identified, at least one of (1) an identification of the media device determined based on the match, or (2) an indication of a failure to identify the match.

8. The non-transitory computer readable medium of claim 7, wherein the instructions, when executed, cause the at least one processor to perform a lookup of the first hardware address using the network address and an address resolution protocol table to identify the first hardware address of the media device.

9. The non-transitory computer readable medium of claim 7, wherein the instructions, when executed, cause the at least one processor to store the first hardware address with an indicator that the first hardware address is unknown when the list does not include the first hardware address.

10. The non-transitory computer readable medium of claim 7, wherein the instructions, when executed, cause the at least one processor to monitor network communications from a local area network, the network communications including the network address.

11. The non-transitory computer readable medium of claim 10, wherein the instructions, when executed, cause the at least one processor to identify the network address from the network communications monitored by a network communicator.

12. The non-transitory computer readable medium of claim 7, wherein the at least one processor is located at a media exposure measurement location.

13. A method comprising:
querying a Dynamic Host Configuration Protocol server to obtain a network address leased to a media device on a network;
responsive to the obtaining of the network address of the media device:
comparing a first hardware address associated with the network address of the media device to a list of known hardware addresses; and
when the list does not include the first hardware address, storing the first hardware address in a data store;
transmitting the first hardware address to a network activity monitoring system operated by a media monitoring entity, the network activity monitoring system to determine if identification data of the media device is known to the network activity monitoring system based on the first hardware address and, in response to determining that the identification data is not known to the network activity monitoring system based on the first hardware address, the network activity monitoring system is to communicate with a device identifying entity to obtain the identification data of the media device based on the first hardware address, the media monitoring entity different than the device identifying entity, the identification data of the media device obtained by the device identifying entity parsing the first hardware address to identify an organizationally unique identifier, the device identifying entity to identify the device based on the organizationally unique identifier;
determining, using the network activity monitoring system of the media monitoring entity, whether the first hardware address has been previously identified based on a mapping table, the mapping table used to translate the identification data determined using the organizationally unique identifier into a device name associated with the media device, the mapping table to identify panelist viewing frequency based on the device name;
responsive to obtaining the identification data from the network activity monitoring system, storing the identification data in the data store;
determining whether to perform a scheduled software update on the media device based on the stored identification data, the stored identification data used to compare the first hardware address of the media device to a second hardware address corresponding to a subset of media devices to be updated;

initiating, upon identification of a match between the first hardware address and the second hardware address, the scheduled software update; and transmitting to the network activity monitoring system, based on whether the match between the first hardware address and the second hardware address is identified, at least one of (1) an identification of the media device determined based on the match, or (2) an indication of a failure to identify the match.

14. The method of claim 13, further including performing a lookup of the first hardware address using the network address and an address resolution protocol table to identify the first hardware address of the media device.

15. The method of claim 13, further including storing the first hardware address with an indicator that the first hardware address is unknown when the list does not include the first hardware address.

16. The method of claim 13, further including receiving network communications from a local area network, the network communications including the network address.

17. The method of claim 16, further including identifying the network address from the network communications received by a network communicator.

* * * * *